(12) United States Patent
Neogi et al.

(10) Patent No.: US 12,181,965 B2
(45) Date of Patent: *Dec. 31, 2024

(54) DATA CENTER MONITORING AND MANAGEMENT OPERATION INCLUDING DATA CENTER ALERT PRIORITIZATION BY SHAPING REWARDS

(71) Applicant: Dell Products L.P., Round Rock, TX (US)

(72) Inventors: Raja Neogi, Portland, OR (US); Khayam Anjam, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/100,855

(22) Filed: Jan. 24, 2023

(65) Prior Publication Data
US 2024/0248787 A1 Jul. 25, 2024

(51) Int. Cl.
G06F 11/07 (2006.01)

(52) U.S. Cl.
CPC ...... G06F 11/0793 (2013.01); G06F 11/0709 (2013.01); G06F 11/0781 (2013.01); G06F 11/0784 (2013.01)

(58) Field of Classification Search
None
See application file for complete search history.

(56) References Cited

U.S. PATENT DOCUMENTS 11,153,177 B1 * 10/2021 Hermoni ............. H04L 43/0876
11,294,756 B1 * 4/2022 Sadrieh ................. G06N 3/047
2015/0278908 A1 * 10/2015 Nice .................. G06Q 30/0631
  705/26.7
2023/0093130 A1 * 3/2023 Fenoglio ............. G06F 18/2433
  709/224
2023/0177345 A1 * 6/2023 Vilcu .................... G06N 3/044
  706/21

OTHER PUBLICATIONS

List of Patents or Applications Treated as Related, Feb. 2023.
Julien Despois, Latent space visualization—Deep Learning bits #2; https://hackernoon.com/latent-space-visualization-deep-learning-bits-2-bd09a46920df, Feb. 23, 2017.
Ekin Tiu, Understanding Latent Space in Machine Learning; Towards Data Science, Feb. 4, 2020, https://towardsdatascience.com/understanding-latent-space-in-machine-learning-de5a7c687d8d.

* cited by examiner

*Primary Examiner* — Fadi Haj Said
(74) *Attorney, Agent, or Firm* — Terrile, Cannatti & Chambers, LLP; Stephen A. Terrile

(57) ABSTRACT

A system, method, and computer-readable medium for performing a data center management and monitoring operation. The data center management and monitoring operation includes: receiving data center data from a plurality of data center assets within a data center, the data center data comprising data center asset data; assigning the data center data to a vectorized input space; reducing a dimension of the vectorized input space to a latent space, the latent space providing an operational status analysis (OSA) model dimension; decoding the latent space to provide a vectorized decoded output space; performing a data center asset operational status forecasting operation using the vectorized decoded output space.

14 Claims, 18 Drawing Sheets

DATA CENTER MONITORING AND MANAGEMENT OPERATION INCLUDING DATA CENTER ALERT PRIORITIZATION BY SHAPING REWARDS

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center management and monitoring operation, comprising: receiving data center data from a plurality of data center assets within a data center, the data center data comprising data center asset data; assigning the data center data to a vectorized input space; reducing a dimension of the vectorized input space to a latent space, the latent space providing an operational status analysis (OSA) model dimension; decoding the latent space to provide a vectorized decoded output space; performing a data center asset operational status forecasting operation using the vectorized decoded output space, the data center asset operational status forecasting operation generating data center asset operational status forecasting data; performing a time estimation operation, the time estimation operation using the data center asset operational status forecasting data; and, prioritizing data center asset remediation operations using the data center asset operational status forecasting data.

In another embodiment the invention relates to a system comprising: a processor; a data bus coupled to the processor; a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for: receiving data center data from a plurality of data center assets within a data center, the data center data comprising data center asset data; assigning the data center data to a vectorized input space; reducing a dimension of the vectorized input space to a latent space, the latent space providing an operational status analysis (OSA) model dimension; decoding the latent space to provide a vectorized decoded output space; performing a data center asset operational status forecasting operation using the vectorized decoded output space, the data center asset operational status forecasting operation generating data center asset operational status forecasting data; performing a time estimation operation, the time estimation operation using the data center asset operational status forecasting data; and, prioritizing data center asset remediation operations using the data center asset operational status forecasting data.

In another embodiment the invention relates to a computer-readable storage medium embodying computer program code, the computer program code comprising computer executable instructions configured for: receiving data center data from a plurality of data center assets within a data center, the data center data comprising data center asset data; assigning the data center data to a vectorized input space; reducing a dimension of the vectorized input space to a latent space, the latent space providing an operational status analysis (OSA) model dimension; decoding the latent space to provide a vectorized decoded output space; performing a data center asset operational status forecasting operation using the vectorized decoded output space, the data center asset operational status forecasting operation generating data center asset operational status forecasting data; performing a time estimation operation, the time estimation operation using the data center asset operational status forecasting data; and, prioritizing data center asset remediation operations using the data center asset operational status forecasting data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
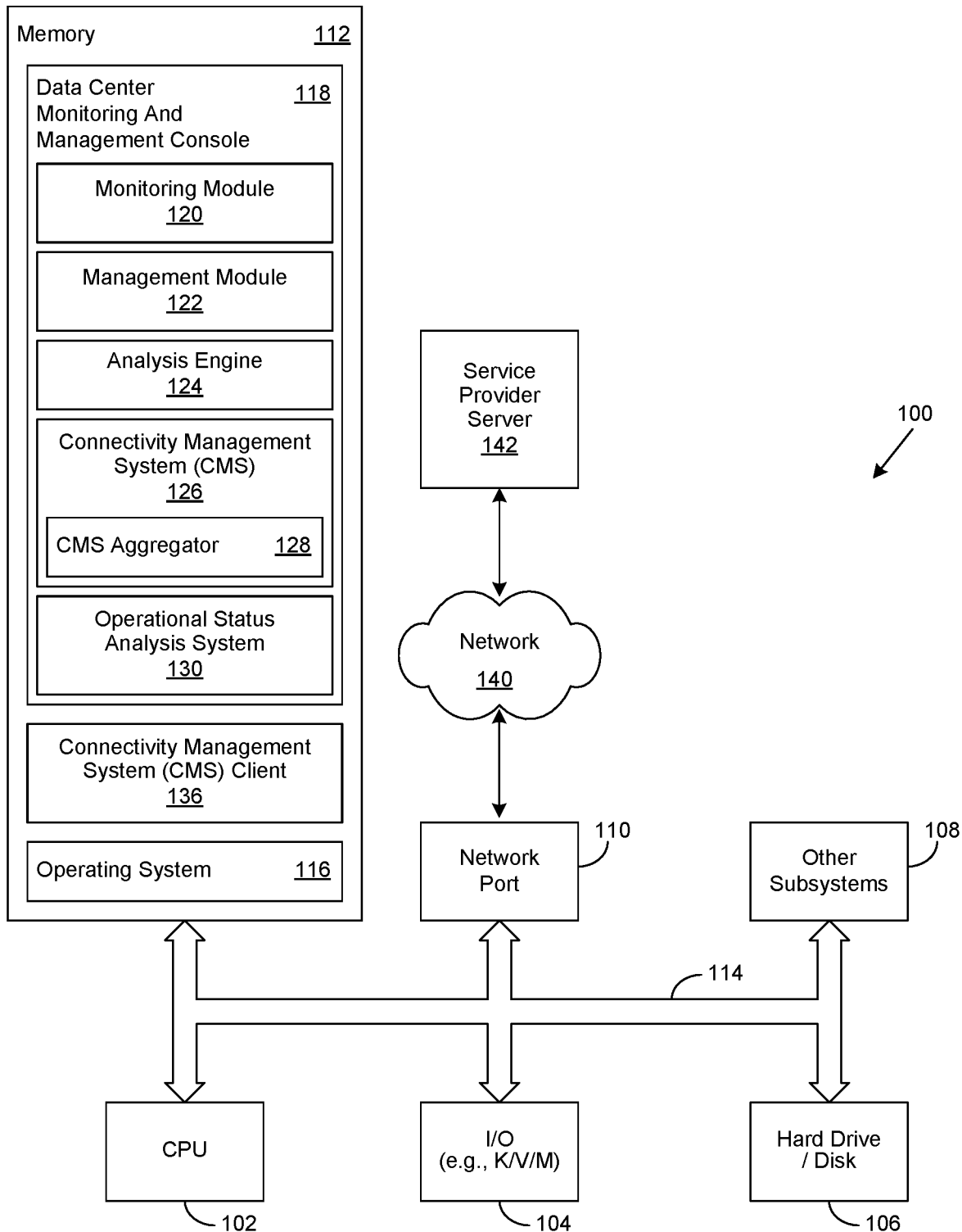
FIG. 1 shows a general illustration of components of an information handling system as implemented in the system and method of the present invention.

A system, method, and computer-readable medium are disclosed for performing a data center monitoring and management operation, described in greater detail herein. Various aspects of the invention reflect an appreciation that it is common for a typical data center to monitor and manage tens, if not hundreds, of thousands of different assets, such as certain computing and networking devices, as described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention likewise reflect an appreciation that the use of cloud-based data center management systems often prove to be advantageous as they allow monitoring and management functions to be performed from anywhere, at any time, according to the user's particular needs, and typically at a reduced cost. Likewise, various aspects of the invention reflect an appreciation that such cloud-based approaches may be implemented to predict the occurrence of a particular data center asset fault by incorporating certain data analytics approaches familiar to those of skill in the art. However, certain aspects of the invention likewise reflect an appreciation that such approaches may benefit by performing certain preprocessing operations prior to the performance of intelligence extraction or control sequencing. Examples of such preprocessing operations include resampling input data, augmenting new features, interpolating gaps in collected data. and so forth.

Various aspects of the invention likewise reflect an appreciation that Koopman operator theory, as described in greater detail herein, can be used advantageously in various approaches to forecast the operational status of a particular data center asset by mapping a small vector space into a function space with linearity. In particular, change-of-variables may be used to linearize a dynamic system even though it may have non-linear characteristics. Likewise, various aspects of the invention reflect an appreciation that telemetry can provide the basis for mapping a particular observed operational state of a certain data center asset to a corresponding target metric. Additionally, certain aspects of the invention reflect an appreciation that such mapping may be implemented to leverage dimension reduction and linear transformation to spot operational anomalies, interpret them. and generate associated alerts as appropriate.

However, various aspects of invention likewise reflect an appreciation that scaling such approaches to monitoring and managing large numbers of data center assets may include prioritization of such alerts according to certain fault criticality and service prioritization factors. For example, one type of fault occurring on one data center asset may be considered more critical than multiple other types of faults occurring on another. As another example, the service prioritization of a workload associated with a particular data center asset may result in an associated alert being given precedence over a similar alert generated by another asset whose associated workload does not have as high a priority. Accordingly, certain aspects of the invention reflect an appreciation that fault criticality and service prioritization are factors for consideration when attempting to achieve maximum processing throughput.

Likewise, certain aspects of the invention reflect an appreciation that the use of deep learning models for data center asset monitoring and management continues to grow. However, various aspects of the invention likewise reflect an appreciation that the behavior of such models, in particular the relationship of their inputs and outputs, tends to drift over time. Accordingly, models used in the monitoring and management of data center assets may need retraining at certain intervals, or after certain events occur, to maintain their accuracy.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118, or a connectivity management system (CMS) client 136. In one embodiment, the information handling system 100 is able to download the data center monitoring and management console 118, or the CMS client 136, or both, from the service provider server 142. In another embodiment, the functionality respectively provided by the data center monitoring and management console 118, or the CMS client 136, or both, may be provided as a service from the service provider server 142.

In certain embodiments, the data center monitoring and management console 118 may include a monitoring module 120, a management module 122, an analysis engine 124, a connectivity management system (CMS) 126, an operational status analysis system 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 136, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 136 to perform a connectivity management operation, described in greater detail herein. As an example, the CMS 126 may be implemented on one information handling system 100, while the CMS client 136 may be implemented on another, as likewise described in greater detail herein.

Figure 2:
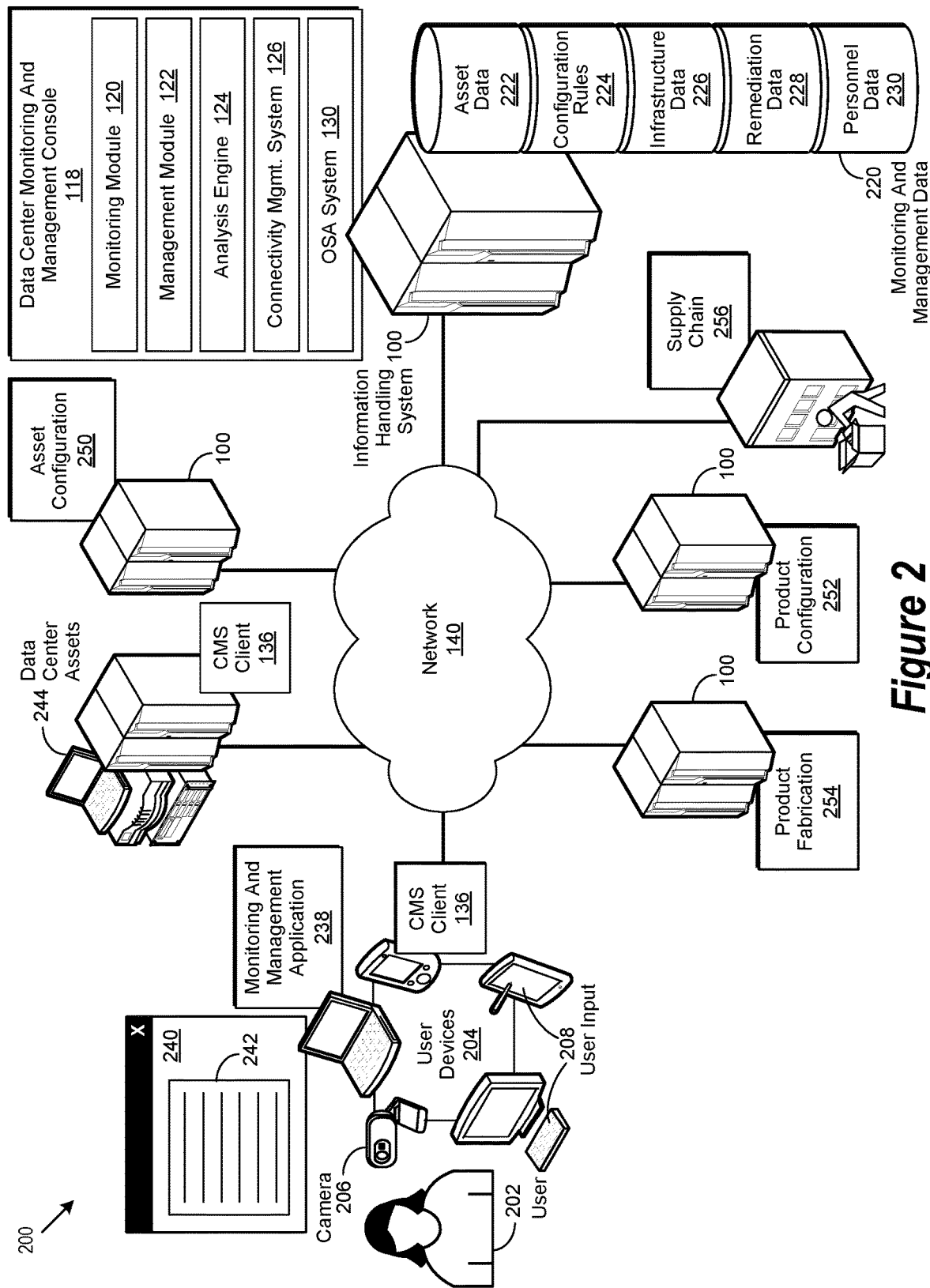
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to a data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioners of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operation may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, and an operational status analysis (OSA) system 130, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the monitoring module 120, the management module 122, the analysis engine 124, and the CMS 126, and the OSA system 130, may be implemented, individually or in combination with one another, to perform a data center asset monitoring and management operation, as likewise described in greater detail herein. In various embodiments, a CMS client 136 may be implemented on certain user devices 204, or certain data center assets 244, or a combination thereof. In various embodiments, the CMS 126 may be implemented in combination with a particular CMS client 136 to perform a connectivity management operation, as described in greater detail herein. In various embodiments, the CMS 126 may likewise be implemented in combination with the OSA system 130 to perform a data center monitoring and management operation, described in greater detail herein. In certain embodiments, a data center monitoring and management operation may be implemented to include one or more OSA operations, likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater detail herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task they are assigned, described in greater detail herein.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well as the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at a later time to perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented to receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure, a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
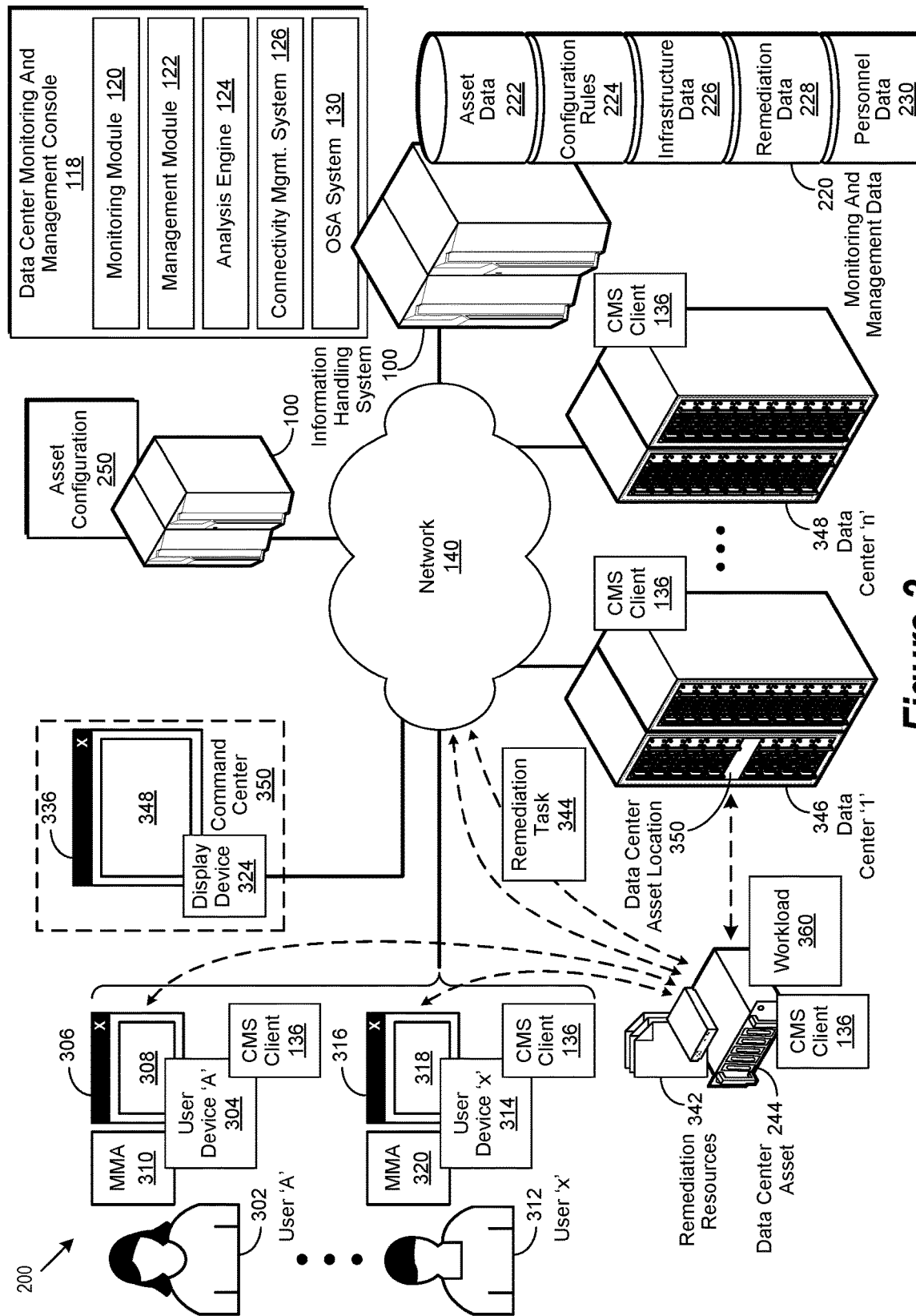
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, and an operational status analysis (OSA) system 130, or a combination thereof, as described in greater detail herein. In various embodiments, a CMS client 136, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 136 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments, the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation. In various embodiments, performance of the data center monitoring and management operation may include the performance of one or more OSA operations, described in greater detail herein.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented to generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
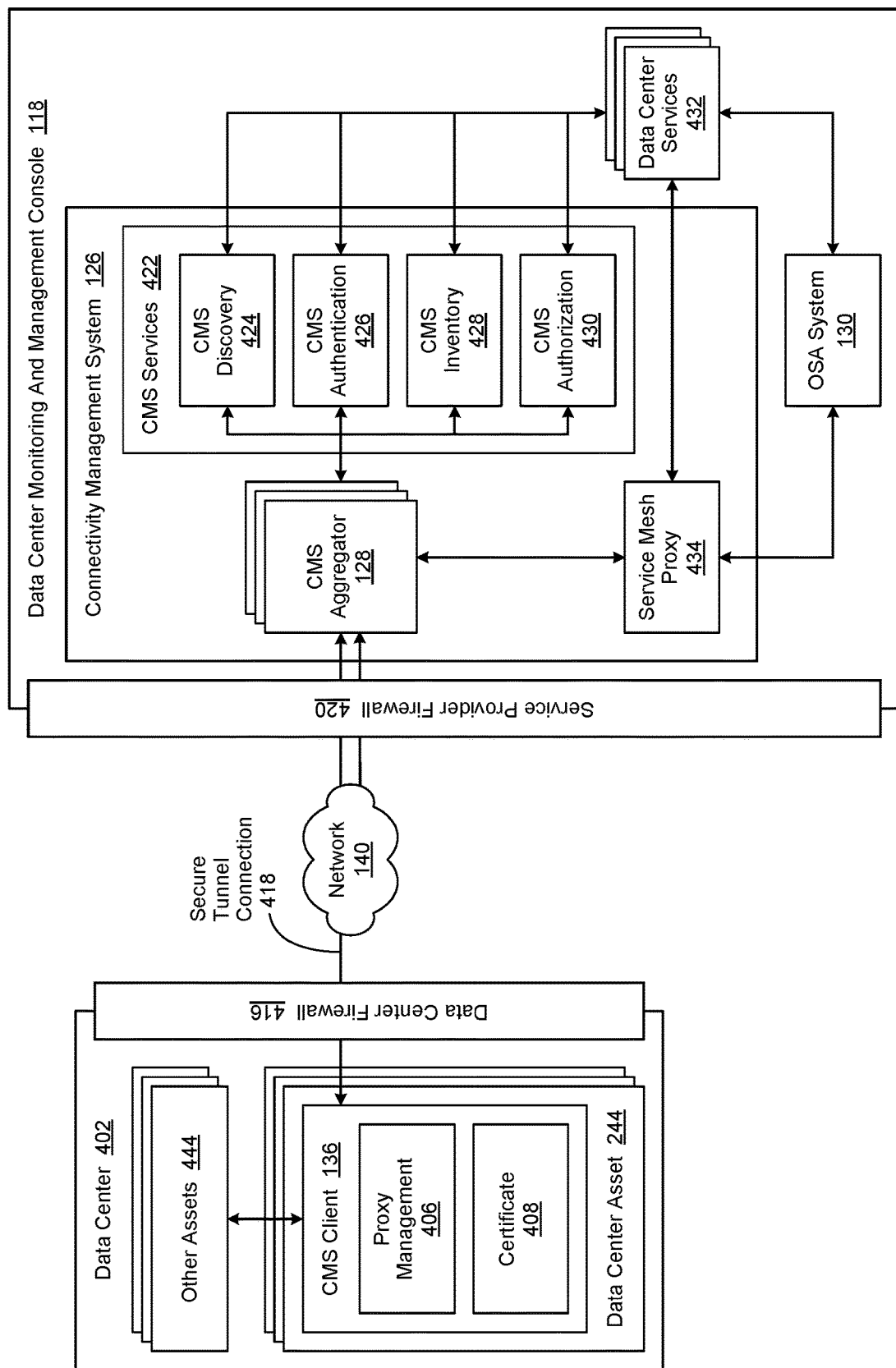
FIG. 4 shows a block diagram of a connectivity management system (CMS)
Figure 5A:
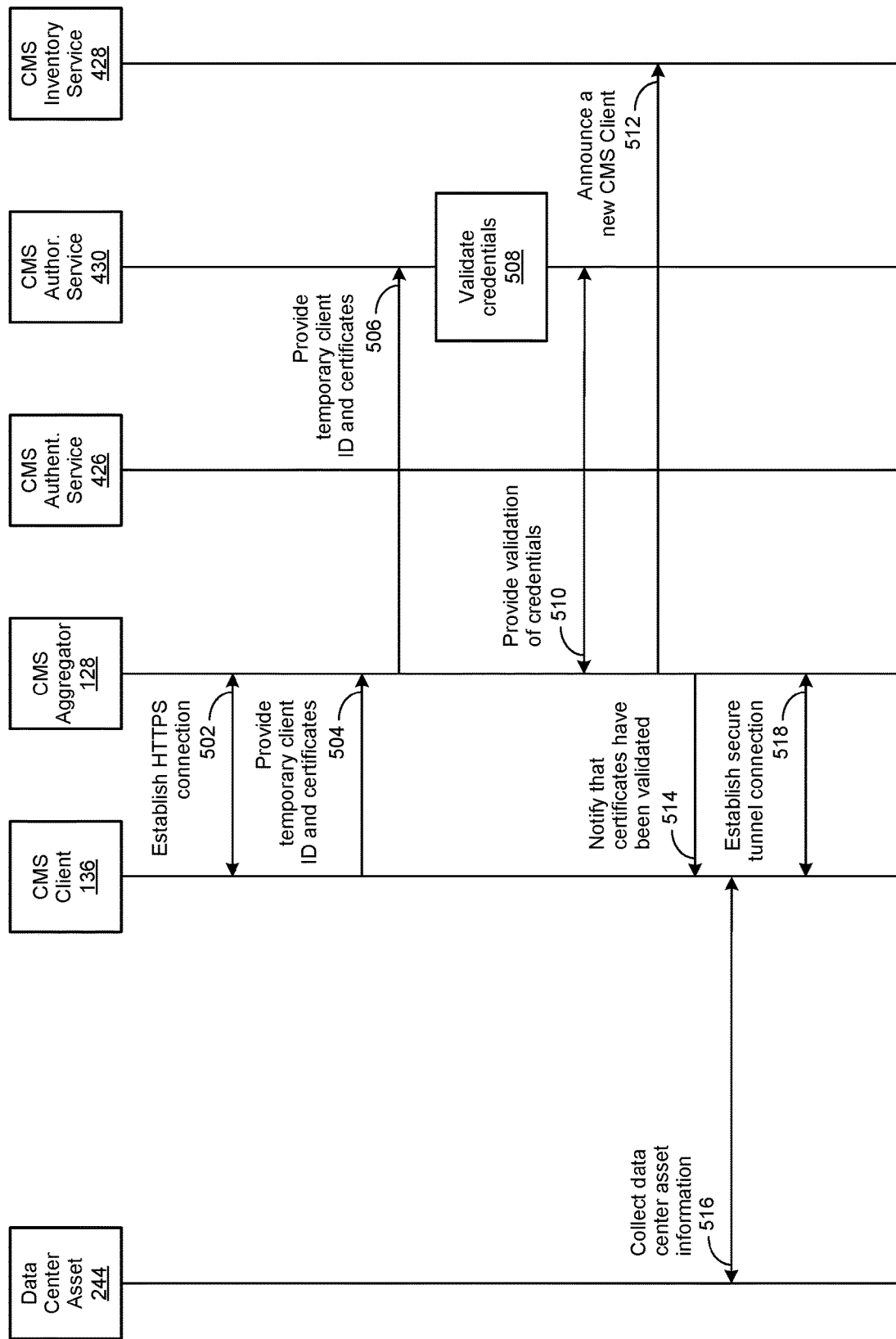
FIGS. 5a through 5d are a sequence diagram showing the performance of certain connectivity management operations.
Figure 5B:
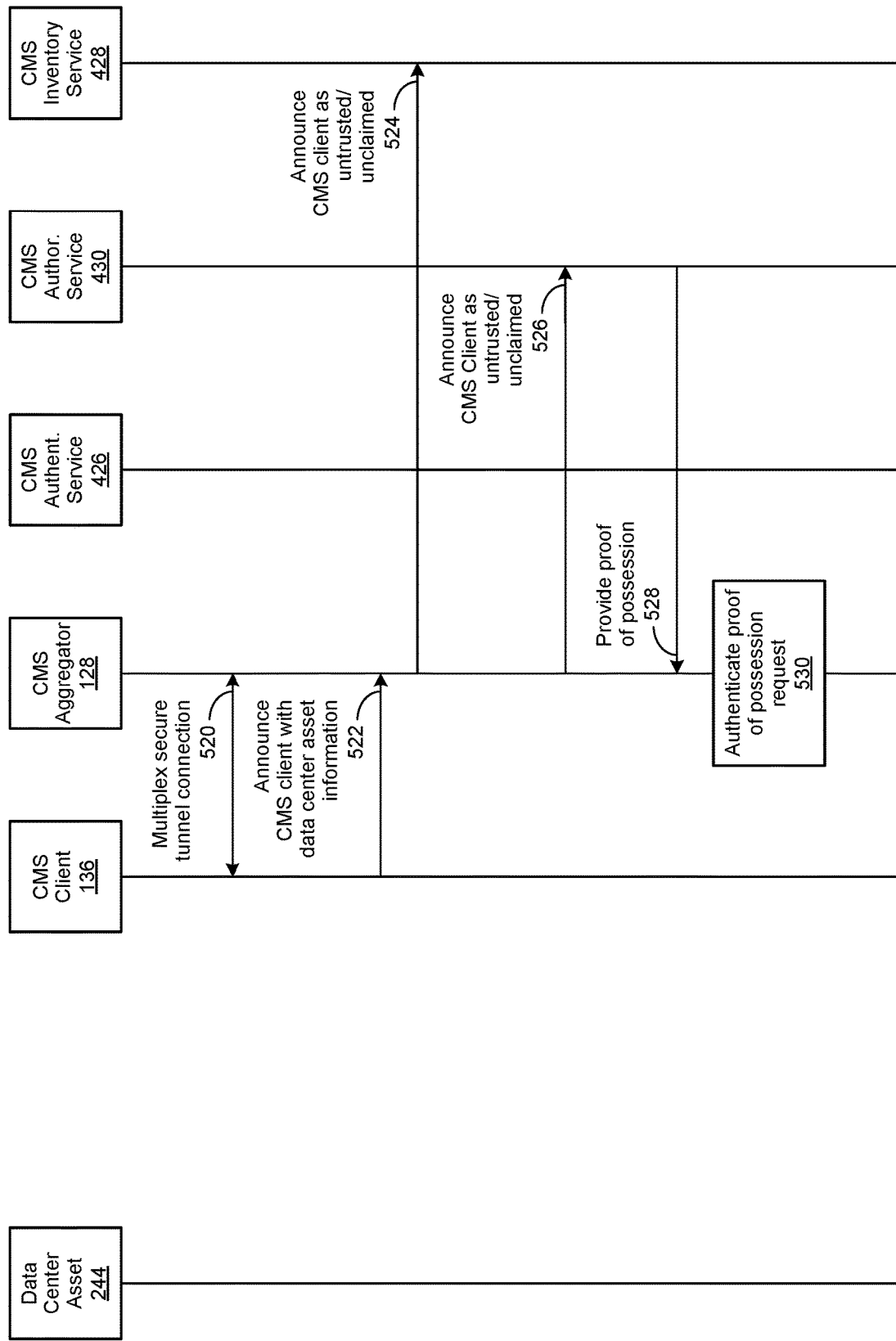
Figure 5C:
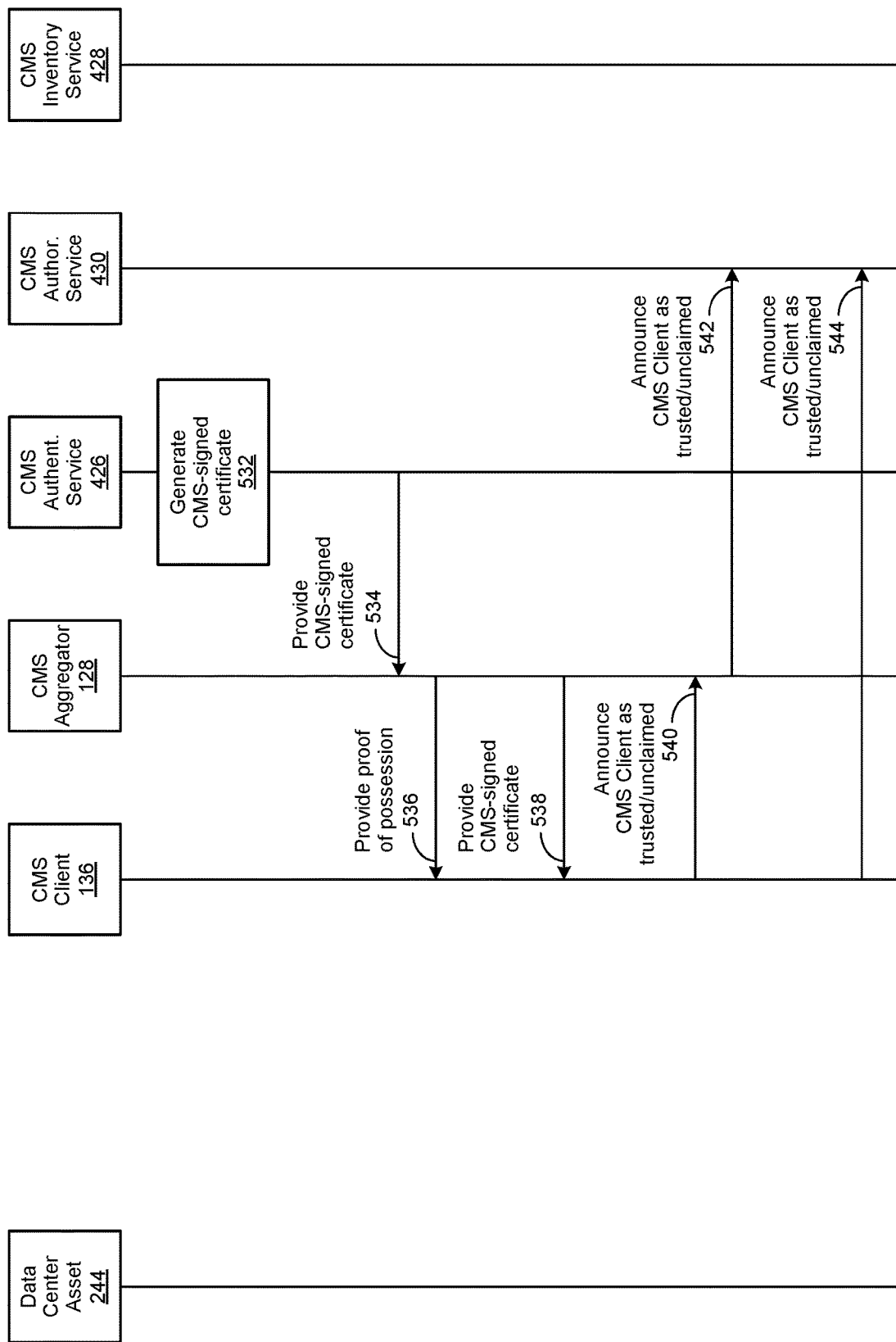
Figure 5D:
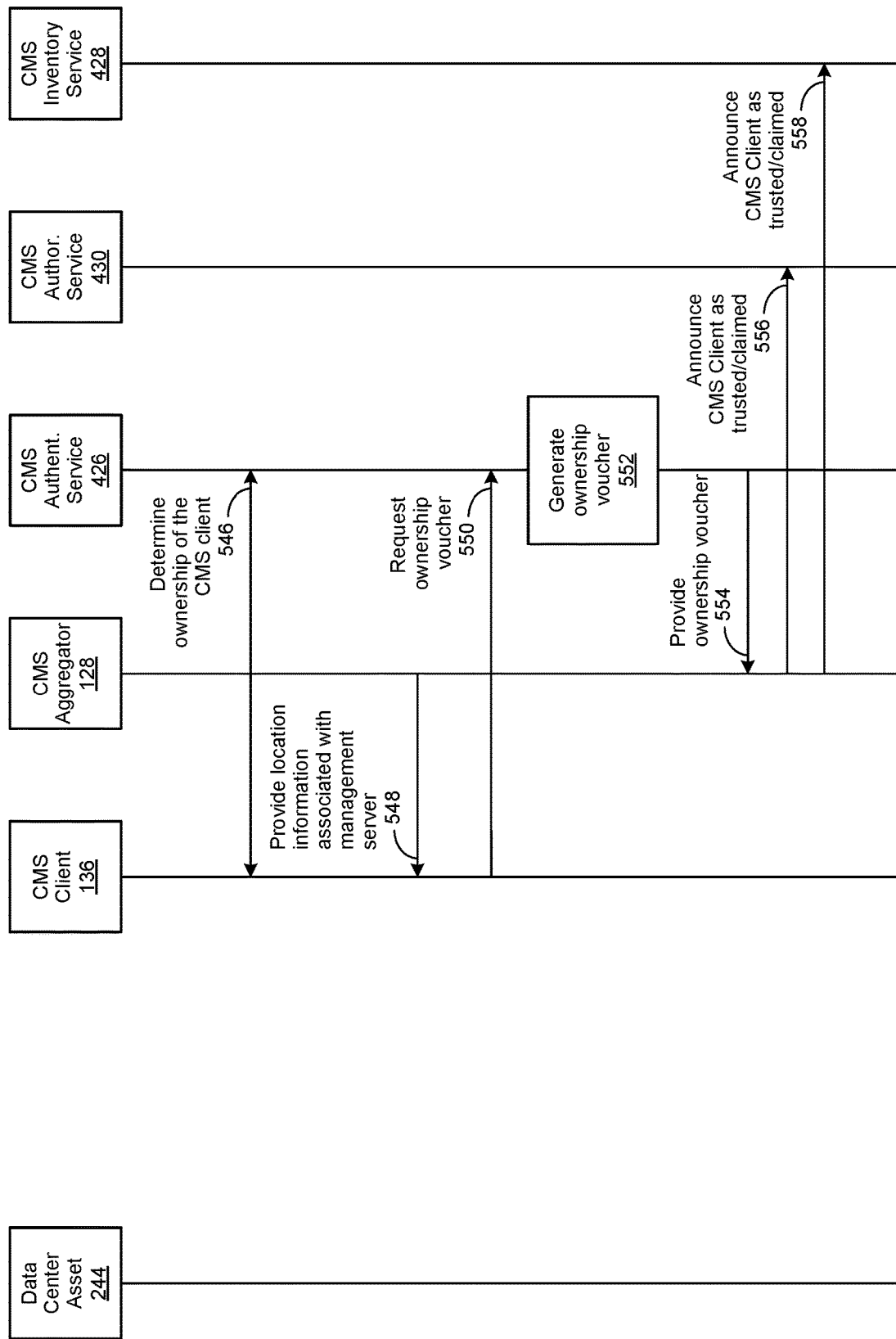

FIG. 4 shows a block diagram of a connectivity management system implemented in accordance with an embodiment of the invention. In various embodiments, a data center monitoring and management console 118, described in greater detail herein, may be implemented to include a connectivity management system (CMS) 126, an operational status analysis (OSA) 130, and one or more data center services 432, or a combination thereof. In various embodiments, the CMS 126 may be implemented individually, or in combination with a particular CMS client 136 to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, each of which are likewise described in greater detail herein.

In various embodiments, the OSA system 130 may likewise be implemented to perform an OSA operation. In certain embodiments, the CMS 126 and the OSA system 130 may likewise be implemented in combination with one another to perform a particular connectivity management operation, or a particular OSA operation, or a combination of the two. As used herein, an OSA operation broadly refers to any function, operation, procedure, or process performed, directly or indirectly, to determine the current, or forecast a future, operational status of a particular data center asset 244.

In various embodiments, the data center monitoring and management console 118 may be implemented in a cloud environment familiar to skilled practitioners of the art. In certain of these embodiments, the operator of the data center monitoring and management console 118 may offer its various functionalities and capabilities in the form of one or more or more cloud-based data center services 432, described in greater detail herein. In various embodiments, one or more data center assets 244 may be implemented within a data center 402, likewise described in greater detail herein. In certain of these embodiments, the data center 402 may reside on the premises of a user of one or more data center services 432 provided by the operator of the data center monitoring and management console 118.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In various embodiments, one or more data center assets 244 may be implemented within a data center 402, described in greater detail herein. In certain embodiments, the data center 402 may be implemented to include an associated data center firewall 416. In certain embodiments, a CMS client 136 may be implemented on one or more data center assets 244. In various embodiments, a CMS client 136 implemented on one data center asset 244 may likewise be implemented to enable one or more connectivity management operations, or one or more OSA operations, or a combination thereof, associated with one or more other data center assets 444 that are not respectively implemented with their own CMS client 136. In certain of these embodiments, the CMS client 136 may be implemented to assume the identity, and attributes, of a particular data center asset it is directly, or indirectly, associated with.

In various embodiments, the CMS client 136 may be implemented with a proxy management module 406. In certain of these embodiments, the proxy management module 406 may be implemented to manage the CMS client's 136 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a firewall may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 136 to pass, while the service provider firewall 420 may be configured to allow traffic emanating from the CMS aggregator 128 to pass. Likewise, the service provider firewall 420 may be configured in various embodiments to allow incoming traffic emanating from the CMS client 136 to be received, while the data center firewall 416 may be configured to allow incoming network traffic emanating from the CMS aggregator 128 to be received.

In various embodiments, a particular CMS aggregator 128 may be implemented in combination with a particular CMS client 136 to provide a split proxy that allows an associated data center asset 244 to securely communicate with a data center monitoring and management console 118. In various embodiments, the split proxy may be implemented in a client/server configuration. In certain of these embodiments, the CMS client 136 may be implemented as the client component of the client/server configuration and the CMS aggregator 128 may be implemented as the server component. In certain of these embodiments, one or more connectivity management operations may be respectively performed by the CMS aggregator 128 and the CMS client 136 to establish a secure tunnel connection 418 through a particular network 140, such as the Internet.

In various embodiments, the secure tunnel connection 418 may be initiated by the CMS client 136 first determining the address of the CMS aggregator 128 it intends to connect to. In these embodiments, the method by which the address of the CMS aggregator 128 is determined is a matter of design choice. Once the address of the CMS aggregator 128 is determined, the CMS client 136 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 136, which triggers the CMS client 136 to provide its requested TLS certificate 408. In certain embodiments, the CMS authentication 426 service may be implemented to generate and provision the TLS certificate 408 for the CMS client 136. In certain embodiments, the CMS client 136 may be implemented to generate a self-signed TLS certificate if it has not yet been provisioned with one from the CMS authentication 426 service.

In various embodiments, the CMS client 136 may then provide an HTTP header with a previously-provisioned authorization token. In certain embodiments, the authorization token may have been generated and provisioned by the CMS authentication 426 service once the CMS client has been claimed. As used herein, a claimed CMS client 136 broadly refers to a particular CMS client 136 that has been bound to an account associated with a user, such as a customer, of one or more data center services 432 provided by the data center monitoring and management console 118.

In certain embodiments, a CMS client 136 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 136, or both, is a matter of design choice.

In various embodiments, the CMS client 136 may be implemented to have a stable, persistent, and unique identifier (ID) after it is claimed. In certain of these embodiments, the CMS client's 136 unique ID may be stored within the authorization token. In these embodiments, the method by the CMS client's 136 unique ID is determined, and the method by which it is stored within an associated authorization token, is a matter of design choice.

Once the CMS client 136 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) to request the CMS client 136 to validate its certificate 408. In certain embodiments, the validation of the CMS client's 136 certificate 408 is performed by the CMS authorization 430 service.

In various embodiments, the validation of the CMS client's 136 certificate 408 is performed to determine a trust level for the CMS client 136. In certain of these embodiments, if the CMS client's 136 certificate 408 is validated, then it is assigned a "trusted" classification. Likewise, if CMS client's 136 certificate 408 fails to be validated, then it is assigned an "untrusted" classification.

Accordingly, certain embodiments of the invention reflect an appreciation that "trusted" and "claimed," as used herein as they relate to a CMS client 136 are orthogonal. More specifically, "trust" means that the channel of communication can be guaranteed. Likewise, "claimed" means the CMS client 136 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 136, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 136 and the CMS aggregator 128 may be implemented to send logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 136. In certain embodiments, the CMS discovery 424 service may be implemented to track the relationships between individual CMS clients 136 and the CMS aggregators 128 they may be connected to.

In various embodiments, the CMS discovery 424 service may be implemented to detect CMS client 136 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 136. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 136 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 136 possesses the private keys corresponding to an associated certificate 408. In various embodiments, the CMS authorization 430 service may be implemented to authenticate a particular CMS client 136 associated with a corresponding data center asset 244. In certain of these embodiments, the CMS authorization 430 service may be implemented to perform the authentication by examining a certificate 408 associated with the CMS client 136 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 136, and one or more CMS aggregators 128, or a combination thereof.

FIGS. 5a through 5d are a sequence diagram showing the performance of certain connectivity management operations implemented in accordance with an embodiment of the invention. In this embodiment, the CMS client 136 establishes a secure Hypertext Transfer Protocol (HTTPS) connection with the CMS aggregator 128 in step 502, as described in greater detail herein, followed by the provision of its temporary client ID and its previously-provisioned digital certificate to the CMS aggregator in step 504.

The CMS aggregator 128 then provides the CMS client 136 ID and (self-signed) digital certificate to the CMS authorization 430 service for authentication in step 506. Once the CMS client's 136 credentials have been validated in step 508, notification of their validation is provided to the CMS aggregator 128 by the CMS authorization 430 service in step 510. In response, the CMS aggregator 128 announces a new CMS client 136 to the CMS inventory 428 service in step 512, followed by the CMS aggregator 128 notifying the CMS client 136 that its digital certificate has been validated in step 514. The CMS client 136 then collects certain information from the data center asset 244 and in step 516, followed by establishing a secure tunnel connection with the CMS aggregator 128 in step 518, which is then multiplexed in step 520, as described in greater detail herein.

Thereafter, the CMS client 136 announces itself to the CMS aggregator 128 and provides it the collected data center asset information in step 522. In turn, the CMS aggregator 128 announces the CMS client 136 as being in an untrusted/unclaimed state, first to the CMS inventory 428 service in step 524, and then to the CMS authorization 430 service in step 526. In turn, the CMS authorization 430 service then requests the CMS aggregator 128 to provide proof of possession in step 528. In response, the CMS aggregator 128 authenticates the proof of possession request in step 530 and the CMS authentication 426 service generates a CMS-signed digital certificate in step 530.

The resulting CMS-signed digital certificate is then provided by the CMS authentication service 426 to the CMS aggregator 128 in step 534. In turn, the CMS aggregator 128 respectively provides the proof of possession and the CMS-signed digital certificate to the CMS client 136 in steps 536 and 538. In response, the CMS client 136 announces itself to be in a trusted/unclaimed state to the CMS aggregator 128 in step 540. In turn, the CMS aggregator 128 announces the CMS client 136 to be in a trusted/unclaimed state to the CMS authorization 430 service in step 542 and to the CMS inventory 428 service in step 544.

The CMS authentication 426 service then determines ownership of the CMS client 136 in step 546, followed by the CMS aggregator 128 providing certain location information associated with the management server to the CMS client 136 in step 548. In turn, the CMS client 136 requests an ownership voucher from the CMS authentication 426 service in step 550. In response, the CMS authorization 430 generates an ownership voucher in step 552 and provides it to the CMS client 136 in step 554. Once it receives the ownership voucher, the CMS client 136 respectively announces itself as trusted/claimed to the CMS authorization service 430 and the CMS inventory 428 service in steps 556 and 558.

Figure 6:
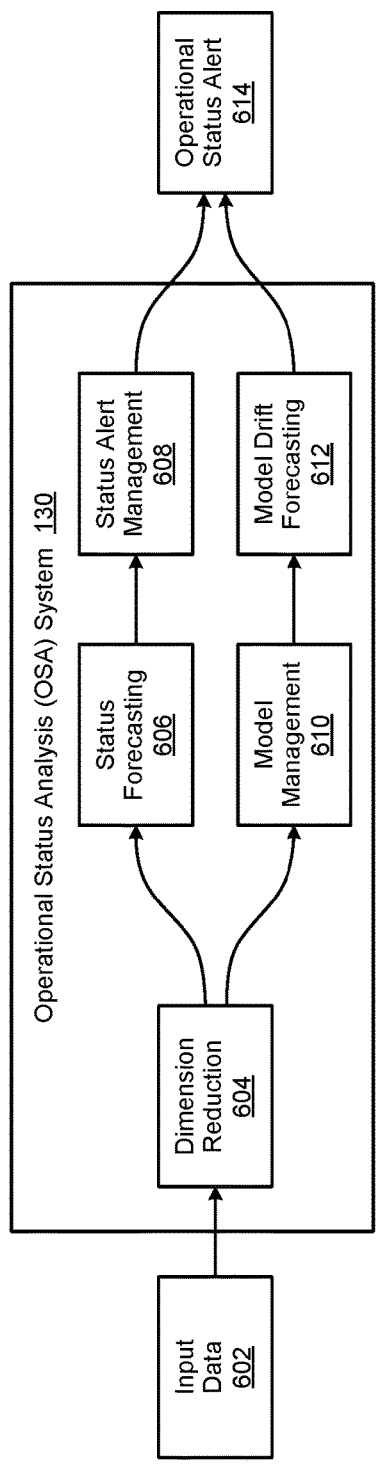
FIG. 6 is a simplified block diagram showing certain functionalities of an operational status analysis (OSA) system implemented to generate an operational status alert.

FIG. 6 is a simplified block diagram showing certain functionalities of an operational status analysis (OSA) system implemented in accordance with an embodiment of the invention to generate an operational status alert. In various embodiments, the OSA system 130 shown in FIG. 6 may be implemented to include a dimension reduction 604 module, an operational status forecasting 606 module, an operational status alert management 608 module, a model management 610 module, and a model drift forecasting 612 module, or a combination thereof. In various embodiments, the OSA system 130 may be implemented to receive certain input data 602, such as telemetry data generated by one or more data center assets, as described in greater detail herein. In certain of these embodiments, the OSA system 130 may be implemented to process such input data 602 to generate one or more operational status alerts 614.

In various embodiments, the dimension reduction 604 module may be implemented to perform one or more dimension reduction operations. As used herein, a dimension reduction operation broadly refers to any function, operation, procedure, or process performed, directly or indirectly, to transform data, such as input data 602, from a high-dimensional space into a low-dimensional space, such that the low-dimensional representation retains some meaningful properties of the original data, ideally close to its intrinsic dimension. Accordingly, the use of dimension reduction may prove to be advantageous when dealing with large numbers of observations, or large numbers of variables, or a combination of the two. Examples of such uses include certain computational operations associated with numerical analysis, sampling, machine learning, and data mining, each of which may be relevant to, or incorporated in, certain data center asset monitoring and management operations.

Skilled practitioners of the art will be aware that working in high-dimensional data spaces may be undesirable for many reasons. For example, certain input data 602 may be sparse, which may cause its analysis to be computationally intractable. Those of skill in the art will be familiar with the concept of computational intractability, which in common usage refers to a problem that in theory can be solved if given large, but finite, resources (e.g., time, computational cycles, etc.), but which in practice consumes too many resources to produce a useful solution.

To illustrate the concept, input data 602 corresponding to fan speeds and operation temperature may be received from a particular server every five minutes. In this example, while the large volumes of fan speed and temperature input data 602 may be processed to forecast a future failure of the server, the lack of its diversity makes it sparse and limits the accuracy of the forecast while consuming significant computational resources. Accordingly, its use may be computationally intractable unless its dimensionality is reduced.

To further illustrate the concept, input data 602 corresponding to a large number of disparate and unrelated workloads (e.g., over a hundred), each of which may have a different resource utilization profile, may be received once an hour from a similarly-configured server. In this example, while the large volumes of workload input data 602 may be processed to forecast the occurrence of an operational failure of the server, its high degree of diversity combined with the infrequency of its collection likewise makes it sparse, and thereby limits the accuracy of the forecast while consuming significant computational resources. Consequently, its use may likewise be computationally intractable unless its dimensionality is reduced.

In various embodiments, the operational status forecasting 606 module may be implemented to perform an operational status forecasting operation. As used herein, forecasting broadly refers to an estimation of future events, which can be made by incorporating and casting forward data related to the past in a predetermined and systematic manner. Accordingly, as likewise used herein, an operational status forecasting operation broadly refers to any data center monitoring and management operation performed, directly or indirectly, to forecast a particular operational state of an associated data center asset at some point of time in the future. In various embodiments, the operational status forecasting 606 module may be implemented to receive the results of one or more dimension reduction operations performed by the dimension reduction 604 module. In certain of these embodiments, the operational status forecasting 606 module may be implemented to use the results of one or more such dimension reduction operations in the performance of one or more operational status forecasting operations.

In various embodiments, the operational status alert management 608 module may be implemented to perform an operational status alert management operation. In various embodiments, the operational status alert management 608 module may be implemented to receive the results of one or more operational status forecasting operations performed by the operational status forecasting 606 module. In certain of these embodiments, the operational status alert management 608 module may be implemented to use the results of one or more such operational status forecasting operations to perform one or more operational status alert management operations. As used herein, an operational status alert management operation broadly refers to any data center monitoring and management operation performed, directly or indirectly, to manage any aspect of an operational status alert 614 associated with the current, or forecasted, operational state of a particular data center asset. In various embodiments, the performance of such operational status alert management operations may include the generation of one or more operational status alerts 614, or their respective prioritization, or their provision, or a combination thereof.

In various embodiments, the model management 610 module may be implemented to perform a model management operation. As used herein, a model management operation broadly refers to any data center monitoring and management operation performed, directly or indirectly, to manage any aspect of an operational status analysis (OSA) model used in the performance of an OSA operation, described in greater detail herein. As likewise used herein, an OSA model broadly refers to any model used, as described in greater detail herein, to determine an operational state of an associated data center asset, at a particular point in time in the past, the present, or in the future. In certain embodiments, an OSA model may be implemented to incorporate one or more aspects of a deep learning model, a performance model, a fault model, or a failure model, or some combination thereof.

As used herein, a deep learning model broadly refers to a machine learning model that incorporates aspects of a neural network having three or more layers. Those of skill in the art will be familiar with neural networks, which attempt to simulate the behavior of the human brain by allowing it to "learn" from large amounts of data. Likewise, these same skilled practitioners of the art will be aware that while a neural network with a single layer can make approximate predictions, additional hidden layers can help to optimize and refine for accuracy. Accordingly, a deep learning model can be implemented to facilitate the discovery of intricate structures within the data they may process by creating multiple levels of abstraction.

As likewise used herein, a performance model broadly refers to a model that defines certain aspects of the way in which one or more proposed, or actual, data center assets, or a combination thereof, operates in terms of resource consumption and contention, and delays introduced by processing or physical limitations, such as speed, network bandwidth, access latency, and so forth. Skilled practitioners of the art will recognize the creation, and use, of such a model may provide insight into how a proposed, or actual, data center asset has worked, currently works, or may work at a particular point in time in the past, the present, or in the future. In various embodiments, certain aspects of a performance model may be implemented such that they may be interpreted by the OSA system 130, or one or more of its modules, to simulate a forecasted behavior of an associated data center asset. In various embodiments, such forecasted behavior may assist in the identification of certain operational bottlenecks or hot spots that justify one or more data center asset remediation operations, described in greater detail herein.

A fault model, as likewise used herein, broadly refers to a model of something that could go wrong in the design, deployment, or operation, of one or more data center assets. Accordingly, such a model may prove useful in forecasting the consequences of the occurrence of such a fault. Likewise, as used herein, a failure model broadly refers to a model that defines failure rates, frequencies, and other statistical details observed in the operation of one or more data center assets. In various embodiments, a failure model may be implemented to simulate the operation of a particular data center asset and recreate associated failures. In certain embodiments, the failure model may be implemented to incorporate Poisson, exponential, Weibull, log-normal, or uniform distributions, or a combination thereof.

In various embodiments, the model drift forecasting 612 module may be implemented, as described in greater detail herein, to perform a model drift forecasting operation. As used herein, a model drift forecasting operation broadly refers to any operation performed, directly or indirectly, to forecast drift in one or more parameters of an OSA model as a result of the operational status of an associated data center asset to one or more points in time. In various embodiments, the model drift forecasting 612 module may be implemented to receive the results of one or more model management operations performed by the model management 610 module. In various embodiments, the results of the performance of one or more model management operations may be used by the model drift forecasting 612 module to perform one or more associated model drift forecasting operations. In certain embodiments, the OSA system 130 may be implemented to use one or more results of the performance of one or more model management operations to determine whether or not to generate a particular operational status alert 614.

Figure 7:
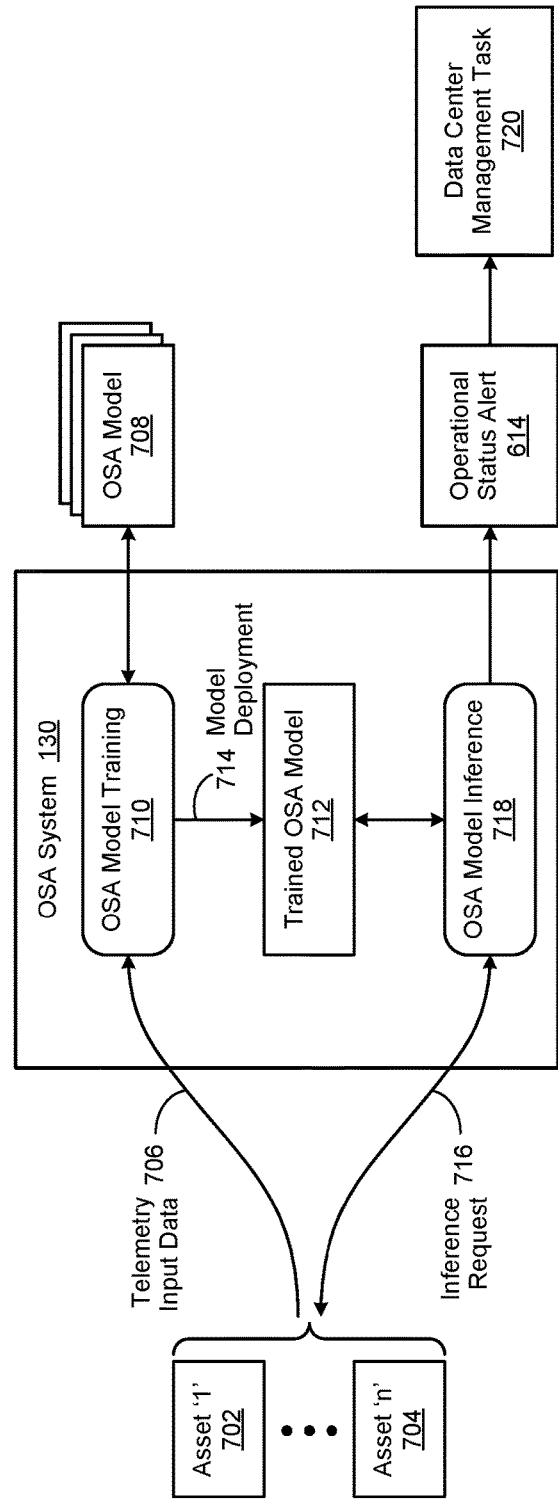
FIG. 7 is a simplified block diagram showing an OSA system implemented to train a model to forecast the occurrence of a data center asset fault.

FIG. 7 is a simplified block diagram showing an operational status analysis (OSA) system implemented in accordance with an embodiment of the invention to train a model to forecast the occurrence of a data center asset fault. In various embodiments, the OSA system 130 shown in FIG. 7 may be implemented to receive telemetry input data 706 from one or more data center assets '1' 702 through 'n' 704. In various embodiments, the telemetry input data 706 may be used by the OSA system 130 to perform certain OSA model training 710 operations on a particular OSA model 708, described in greater detail herein.

As used herein, OSA model training 710 broadly refers to any function, operation, procedure, or process performed, directly or indirectly, to fit an optimum combination of weights and bias to a machine learning algorithm to minimize a loss function over a particular forecasting range. In various embodiments, the OSA model training 710 may be performed using one or more semi-supervised model training approaches. As likewise used herein, semi-supervised training broadly refers to machine learning approaches combining supervised and unsupervised learning that uses a small amount of labeled data and a large amount of unlabeled data. Accordingly, semi-supervised training, as typically implemented, can provide the benefits of both unsupervised and supervised learning while avoiding the challenges of finding a large amount of labeled data.

In various embodiments, the result of one or more OSA model training 710 operations performed by the OSA system 130 may be the generation of a trained OSA model 712. In various embodiments, a trained OSA model 712 may be deployed 714 for use by the OSA system 130 in the performance of one or more OSA model inference operations 718. As used herein, an OSA model inference operation 718 broadly refers any function, operation, procedure, or process performed, directly or indirectly, to infer, a past, current, or future operational status of a particular data center asset '1' 702 through 'n' 704. In certain embodiments, such as past, current, or future operational status may be the occurrence of a fault, an error condition, or a failure, or a combination thereof, of a particular data center asset '1' 702 through 'n' 704.

In various embodiments, one or more data center assets '1' 702 through 'n' 704 may be implemented to generate an inference request 716. In various embodiments, the OSA system 130 may be implemented to receive such an inference request 716. In certain embodiments, the OSA system 130 may likewise be implemented to perform one or more OSA model inference operations 718 in response to receiving such an inference request 716. In various embodiments, the result of performing one or more OSA model inference operations 718 may be the generation of one or more operational status alerts 614, described in greater detail herein. In certain embodiments, the generation of a particular operational status 614 may result in the performance of an associated data center management task 720, likewise described in greater detail herein.

Figure 8:
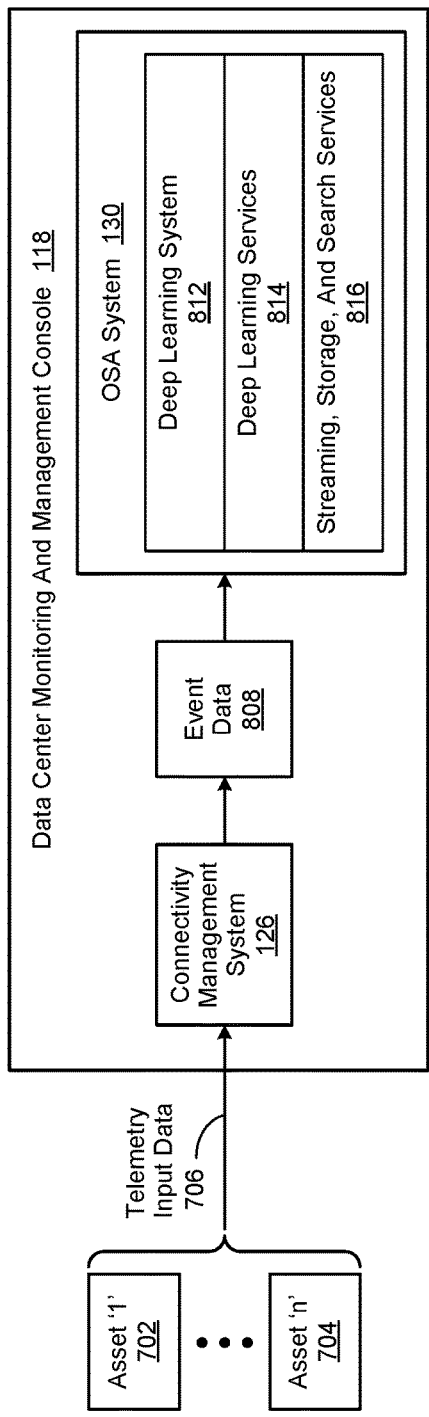
FIG. 8 is a simplified block diagram showing an OSA system implemented to perform certain deep learning operations.

FIG. 8 is a simplified block diagram showing an operational status analysis (OSA) system implemented in accordance with an embodiment of the invention to perform certain deep learning operations. In various embodiments, a data center monitoring and management console 118 may be implemented to include a connectivity management system (CMS) 126 and an OSA system 130, both of which are described in greater detail herein. In various embodiments, the CMS 126 may be implemented to receive certain telemetry input data 706 from one or more data center assets '1' 702 through 'n' 704.

In various embodiments, the CMS 126 may be implemented to provide certain portions of telemetry input data 706 it may receive to the OSA system 130 as event data 808. As used herein, event data 808 broadly refers to certain data center monitoring and management data, described in greater detail herein, associated with the occurrence of an event corresponding to a change in the operational status of a particular data center asset at a particular point of time. In certain embodiments, the occurrence of such a change in operational status may correspond to a particular data center asset experiencing an error condition, a fault, a failure, or other anomalous behavior. In various embodiments, certain event data 808 may be used in the performance of one or more OSA operations, described in greater detail herein.

In various embodiments, the OSA system 130 may be implemented to include a deep learning system 816. In certain embodiments, the deep learning system 816 may be implemented to perform a deep learning operation. As used herein, a deep learning operation broadly refers to any machine learning function, operation, procedure, or process performed, directly or indirectly, to facilitate the discovery of intricate structures within a particular body of data by creating multiple levels of abstraction.

In various operations, the deep learning system 816 may be implemented to use the event data 808 provided by the CMS 126, in part or in whole, to perform one or more deep learning operations. In certain of these embodiments, one or more deep learning operations may be performed by the deep learning system 816 to infer, or forecast, a future operational status, of a particular data center asset '1' 702 through 'n' 704. In certain embodiments, such a future operational status may be the occurrence of an anomalous behavior, a fault, an error condition, or a failure, or a combination thereof, associated with a particular data center asset '1' 702 through 'n' 704. In various embodiments, the deep learning system 816 may be implemented to offer the performance of one or more deep learning operations as a deep learning service 814. In various embodiments, the OSA system 130 may be implemented to provide the results of one or more deep learning operations performed by the deep learning system 812 as one or more streaming, storage, or search services 816, or a combination thereof.

Figure 9:
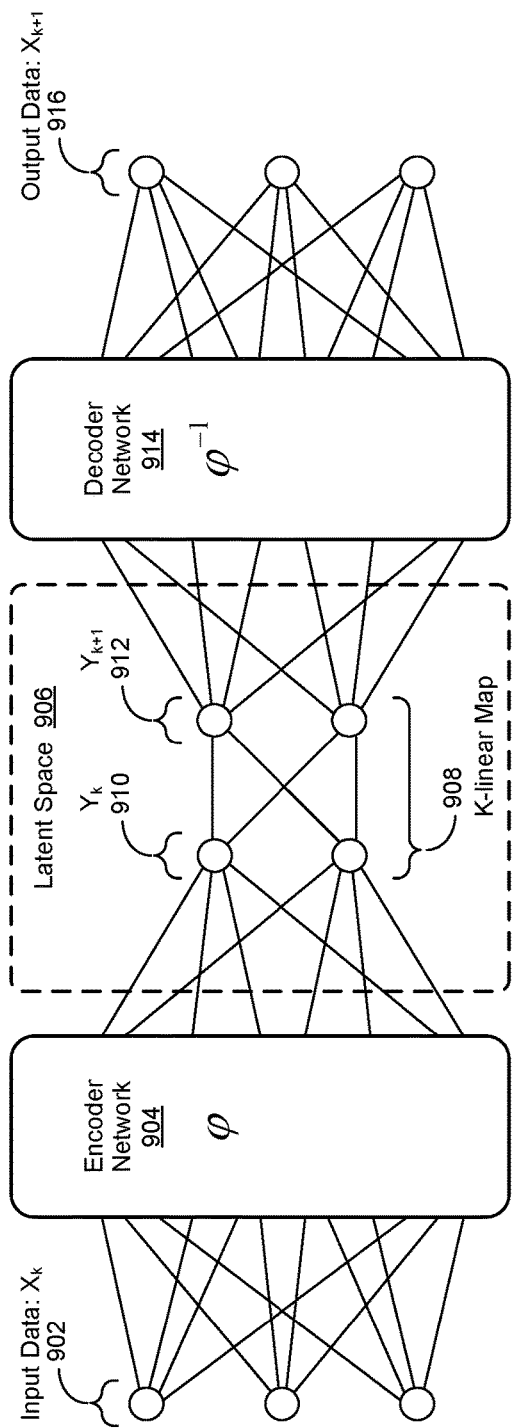
FIG. 9 is a simplified block diagram showing an OSA model incorporating a latent space to detect certain outlier data.

FIG. 9 is a simplified block diagram showing an operational status analysis (OSA) model incorporating a latent space implemented in accordance with an embodiment of the invention to detect certain outlier data. Skilled practitioners of the art will be familiar with the concept of a latent space 906, also known as a latent feature space or embedding space, which is an embedding of a set of items within a manifold such that items resembling each other are positioned closer to one another than those that do not. Those of skill in the art will likewise be aware that position within the latent space 906 can be viewed as being defined by a set of latent variables that emerge from the resemblances of its member objects. In certain embodiments of the invention, the dimensionality of the latent space 906 may be chosen to be lower than the dimensionality of the feature space from which the data points are drawn. As used herein, a feature, as it relates to a latent space 906, broadly refers to an individual, measurable property or characteristic of a phenomenon, such as the occurrence of an event associated with a particular data center asset.

Accordingly, the construction of a latent space 906 is an example of dimension reduction, which can also be viewed as a form of data compression. Likewise, latent spaces 906 are generally fit via known machine learning approaches, and as such, they can be used as feature spaces in machine learning models, including classifiers and other supervised predictors. However, certain embodiments of the invention reflect an appreciation that the interpretation of such latent spaces 906 used in machine learning models is often difficult to achieve due to their unintuitive nature. Additionally, a latent space 906 may be high-dimensional, complex, and nonlinear, which may add to the difficulty of interpretation.

In various embodiments, an OSA model, such as that shown in FIG. 9, may be used to process certain input data $X_k$ 902, such as telemetry data, described in greater detail herein, collected from one or more data center assets. In various embodiments, certain elements of input data $X_k$ 902 may be associated with an operational theme associated with a particular data center asset. As used herein, an operational theme broadly refers to a particular operational aspect of one or more data center assets. In certain embodiments, the input data $X_k$ 902 may be associated with the occurrence of an event corresponding to a particular operational theme.

As an example, overheating may be an operational theme associated with a particular server. In this example, its operating temperature of the server, the respective speeds of its fans, the utilization of its processor or associated peripherals, the ambient temperature of the data center, and so forth, might be elements of input data $X_k$ 902. Accordingly, a spike in the operating temperature of the server may correspond to an event associated with the operational theme of overheating.

As another example, throughput may be a different operational theme associated with the same server. In this example, the throughput of the server, the number of workloads currently running on the server, their type (e.g., database assess, web server, etc.), along with their respective utilization of processing, memory, network, and other resources, might likewise be elements of input data $X_k$ 902. Accordingly, a sudden reduction in throughput (e.g., 40%) at a particular point in time may correspond to an event associated with the operational theme of throughput.

In various embodiments, the input data $X_k$ 902 may then be encoded by an encoder network φ 904 to generate encoded data $Y_k$ 910. In various embodiments, a K-linear map 908 may be implemented to map the encoded data $Y_k$ 910 within the latent space 908 such that is linearly dependent upon other encoded data $Y_{k+1}$ 912, and vice-versa. Skilled practitioners of the art will be familiar with a K-linear map 908, also commonly referred to as a K-linear function, K-linear operator, or K-linear transformation, which is a morphism in K-Vect, or K-Mod, which respectively are a homomorphism of vector spaces or modules.

Those of skill in the art will likewise be familiar with the concept of Vect, where the category of k-vector spaces $Vect_k$ is a category of a given field k, whose objects are vector spaces, and whose morphisms are linear maps. In common practice, Vect may be written in place of $Vect_k$ if the field k is understood. Accordingly, a K-linear map 908 between K-linear spaces V and W is a function T:V→W, such that:

$$T(rx + y) = rT(x) + T(y), T(rx + y) = rT(x) + T(y)$$

for x and y elements of V, and an r element of K, where this one identity is enough to ensure that T preserves all linear combinations.

In various embodiments, the linearized encoded data $Y_{k+1}$ 912 may then be decoded by a decoder network $φ^{-1}$ 914 to generate output data $X_{k+1}$ 916. In various embodiments, the resulting output data $X_{k+1}$ 916 may then be compared to the original input data $X_k$ 902 to determine whether they are the same. If they are, then the encoded data $Y_k$ 910 and $Y_{k+1}$ 912 are linearly dependent, and the forecasted output data $X_{k+1}$ 916 can be verified to be accurate. However, if they are not, then it is possible that certain input data $X_k$ 902 may be an outlier.

Figure 10:
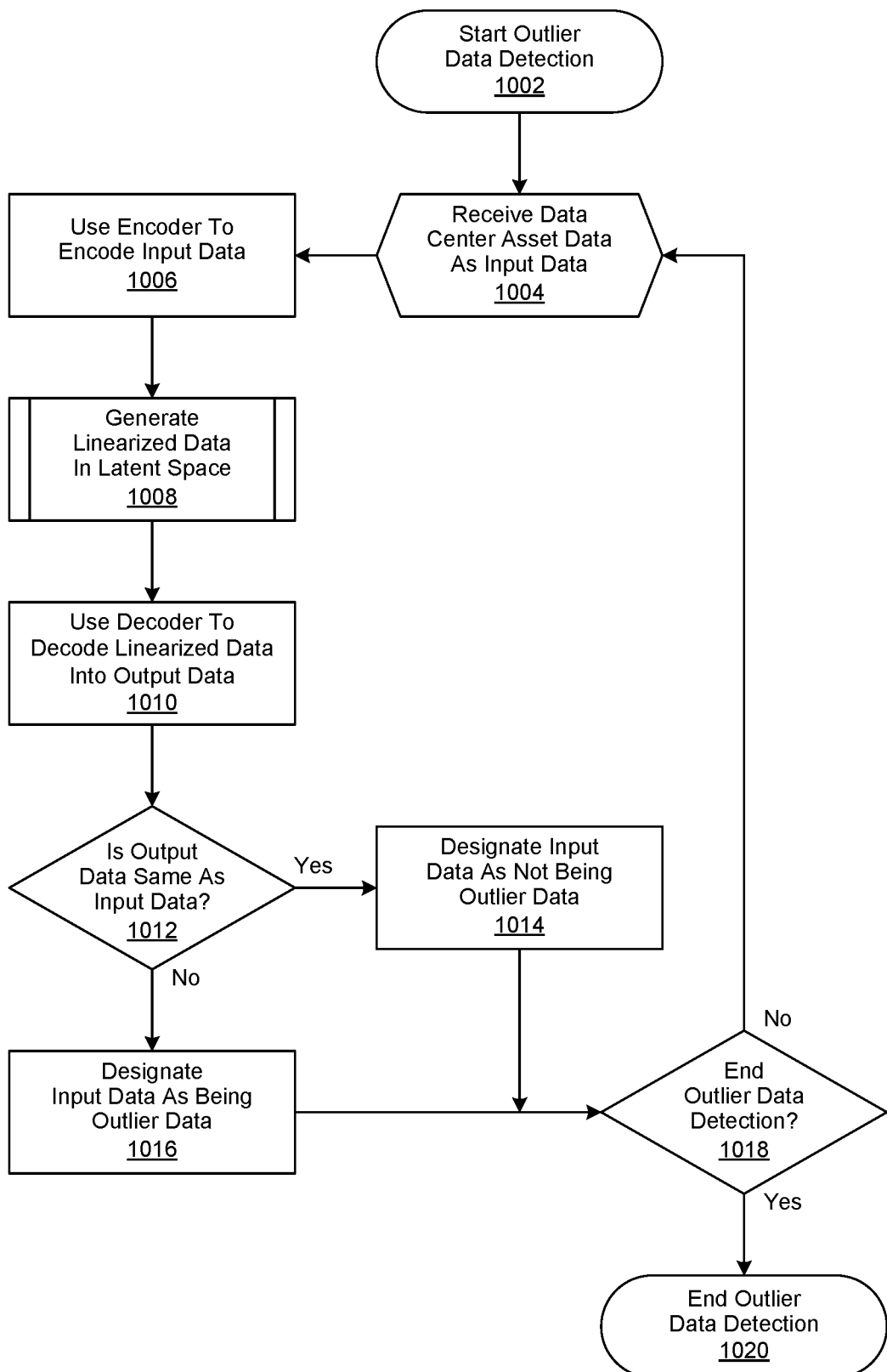
FIG. 10 is a flowchart of the performance of certain outlier data detection operations performed in accordance with an embodiment of the invention.

FIG. 10 is a flowchart of the performance of certain outlier data detection operations performed in accordance with an embodiment of the invention. As used herein, outlier data broadly refers to data corresponding to anomalous, unusual, or unexpected operational behavior of a particular data center asset. In this embodiment, outlier data detection operations are begun in step 1002, followed by the receipt of certain data center asset data as input data in step 1004. The input data is then encoded in step 1006 by an encoder, as described in greater detail herein, to generate linearized data within a latent space in step 1008, as likewise described in greater detail herein.

In turn, a decoder is then used in step 1010 to decode the resulting linearized data into output data, as described in greater detail herein. A determination is then made in step 1012 whether the resulting output data is substantively the same as the input data. If so, then the input data is designated as not being outlier data center asset data in step 1014.

Otherwise, the input data is designated as being outlier data center asset data in step 1016.

Thereafter, or after the input data is designated as not being outlier data center asset data in step 1014, a determination is made in step 1018 whether to end outlier data detection operations. If not, then the process is continued, proceeding with step 1004. Otherwise, outlier data detection operations are ended in step 1020.

Figure 11:
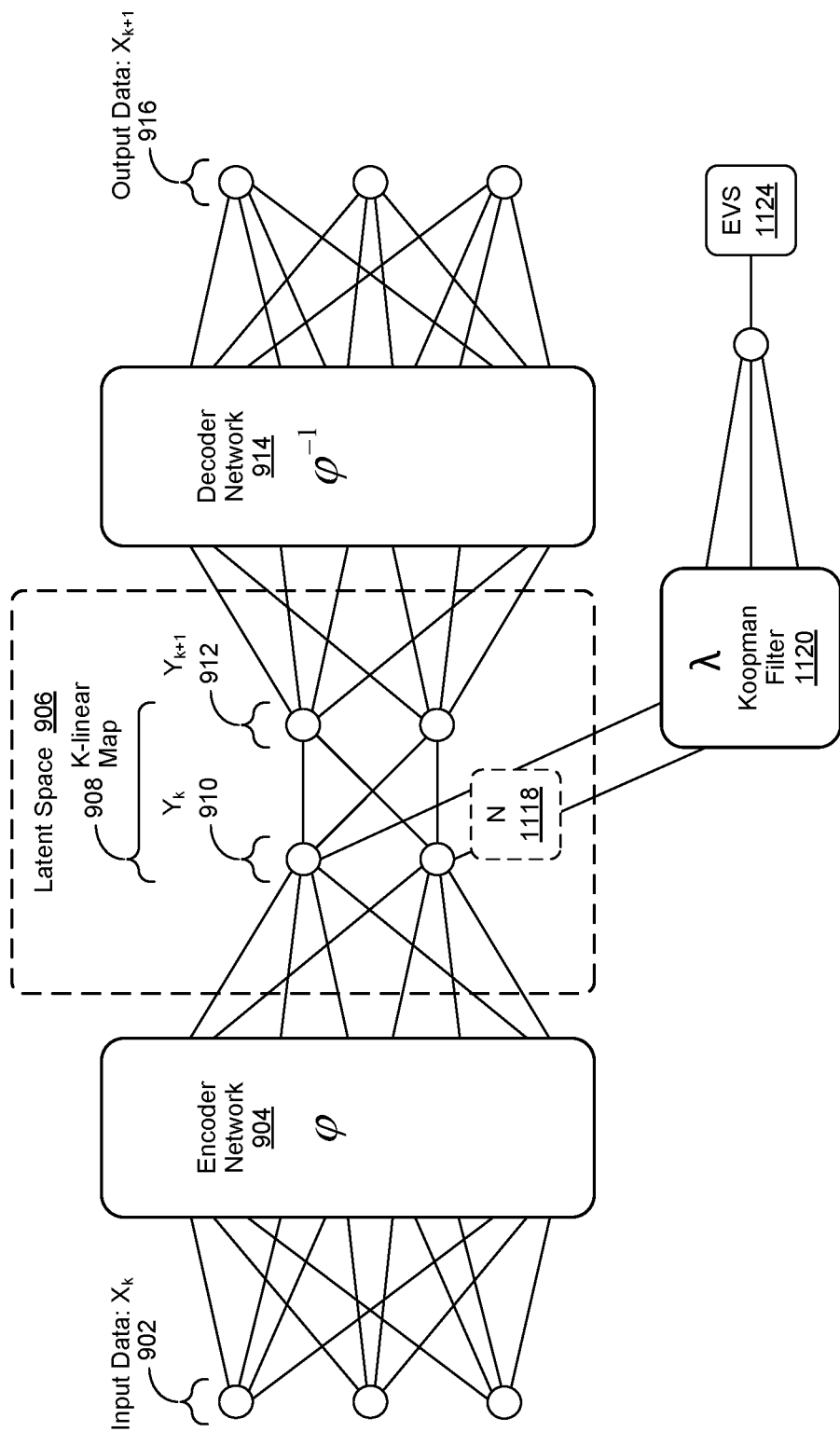
FIG. 11 is a flowchart of the performance of certain outlier data detection operations.

FIG. 11 is a simplified block diagram showing an operational status analysis (OSA) model incorporating a latent space implemented in accordance with an embodiment of the invention to forecast the operational status of a particular data center asset. In various embodiments, an OSA model, such as that shown in FIG. 11, may be used to process certain input data $X_k$ 902, such as telemetry data, described in greater detail herein, collected from one or more data center assets. In various embodiments, the input data $X_k$ 902 may then be encoded by an encoder network (p 904 to generate encoded data $Y_k$ 910. In various embodiments, a K-linear map 908 may be implemented, as described in greater detail herein, to map the encoded data $Y_k$ 910 within the latent space 908 such that it is linearly dependent upon other encoded data $Y_{k+1}$ 912, and vice-versa.

In various embodiments, the linearized encoded data $Y_{k+1}$ 912 may then be decoded by a decoder network $\varphi^{-1}$ 914 to generate output data $X_{k+1}$ 916. In various embodiments, the resulting output data $X_{k+1}$ 916 may then be compared to the original input data $X_k$ 902 to determine whether they are the same. If they are, then the encoded data $Y_k$ 910 and $Y_{k+1}$ 912 are linearly dependent, and the forecasted output data $X_{k+1}$ 916 can be verified to be accurate. However, if they are not, then the latent space 906 can be traversed, and the values of the encoded data $Y_k$ 910 and $Y_{k+1}$ 912 adjusted until the resulting values of the output data $X_{k+1}$ 916 are the same as the original input data $X_k$ 902.

In various embodiments, the smallest dimensional value 'N' 1118 of the encoded data $Y_k$ 910 and $Y_{k+1}$ 912 may be used as a starting point to determine the next state of $X_{k+1}$ 916. In various embodiments, determining the next state of $X_{k+1}$ 916 produces a set of data that can be used to verify that the model is being trained. In certain embodiments, the adjusted dimensional values of the encoded data $Y_k$ 910 and $Y_{k+1}$ 912 may be implemented as Eigenvectors.

Skilled practitioners of the art will be familiar with Eigenvectors, which in linear algebra is a characteristic nonzero vector of a linear transformation that changes at most by a scalar factor when that linear transformation is applied to it. The corresponding Eigenvalue, often denoted by λ, is the factor by which the Eigenvector is scaled. Geometrically, an Eigenvector, corresponding to a real nonzero Eigenvalue λ, points in a direction in which it is stretched by the transformation, and the Eigenvalue λ is the factor by which it is stretched. If the Eigenvalue λ is negative, then the direction of its associated Eigenvector is reversed.

Accordingly, the dimensional values of the encoded data $Y_k$ 910, which in certain embodiments may be implemented as Eigenvectors, can be mapped via a Koopman filter X 1120 to generate a sequence of Eigenvalues as an Eigenvalue spectrum (EVS) 1124. In various embodiments, the Koopman filter X 1120 may be based upon a Koopman operator. Skilled practitioners of the art will be familiar with the concept of a Koopman operator, which is a linear operator that describes the evolution of scalar observables in an infinite dimensional space.

Those of skill in the art will likewise be aware that Koopman observable subspaces provide a way of representing a dynamic system that is conducive for use in known approaches to machine learning. In particular, certain physical systems exhibit non-linear, multi-scale, and chaotic phenomena which can be difficult to model and control. However, the use of a Koopman operator allows the representation of any dynamic system through the use of linear dynamics.

In various embodiments, the resulting EVS 1124 may be used to determine whether or not a fault, or other error condition has occurred. In various embodiments, such a determination can be used to calculate a success probability, which may in turn be used to calculate a failure probability. In certain embodiments, the failure probability may then be used to forecast the extent, or criticality, or both, of a particular fault, or other error condition, associated with a particular data center asset.

As an example, a continuous stream of certain telemetry data may be collected from a particular server. In this example, the telemetry data may be received as input data $X_k$ 902, which can then be processed as described in greater detail herein to generate linearized data $Y_k$ 910 and $Y_{k+1}$ 912 within a latent space 906. In turn, the smallest value 'N' 1118 of the linearized data $Y_k$ 910 (e.g., a value of '1') may be adjusted by a particular Eigenvalue λ 1120 to generate an EVS 1124 such that the occurrence of a fault, or other error condition, associated with the server can be forecasted.

In various embodiments, the parameters for such adjustment may include an independently and identically distributed (IID) thresholding parameter T, a reduced dimension parameter N 1118, inputs for a behavior cloning parameter M, and an encode depth parameter ED. In these embodiments, the dimension of x is T, and each input in x is independent. Likewise, N is the dimension of y, and the behavior cloning parameter M can be smaller or equal to N, with the encoder depth of ED set for model linearity conformance. In certain of these embodiments, a data center remediation operation, described in greater detail herein, may be scheduled in advance of a forecasted occurrence of a fault, or other error condition.

Figure 12:
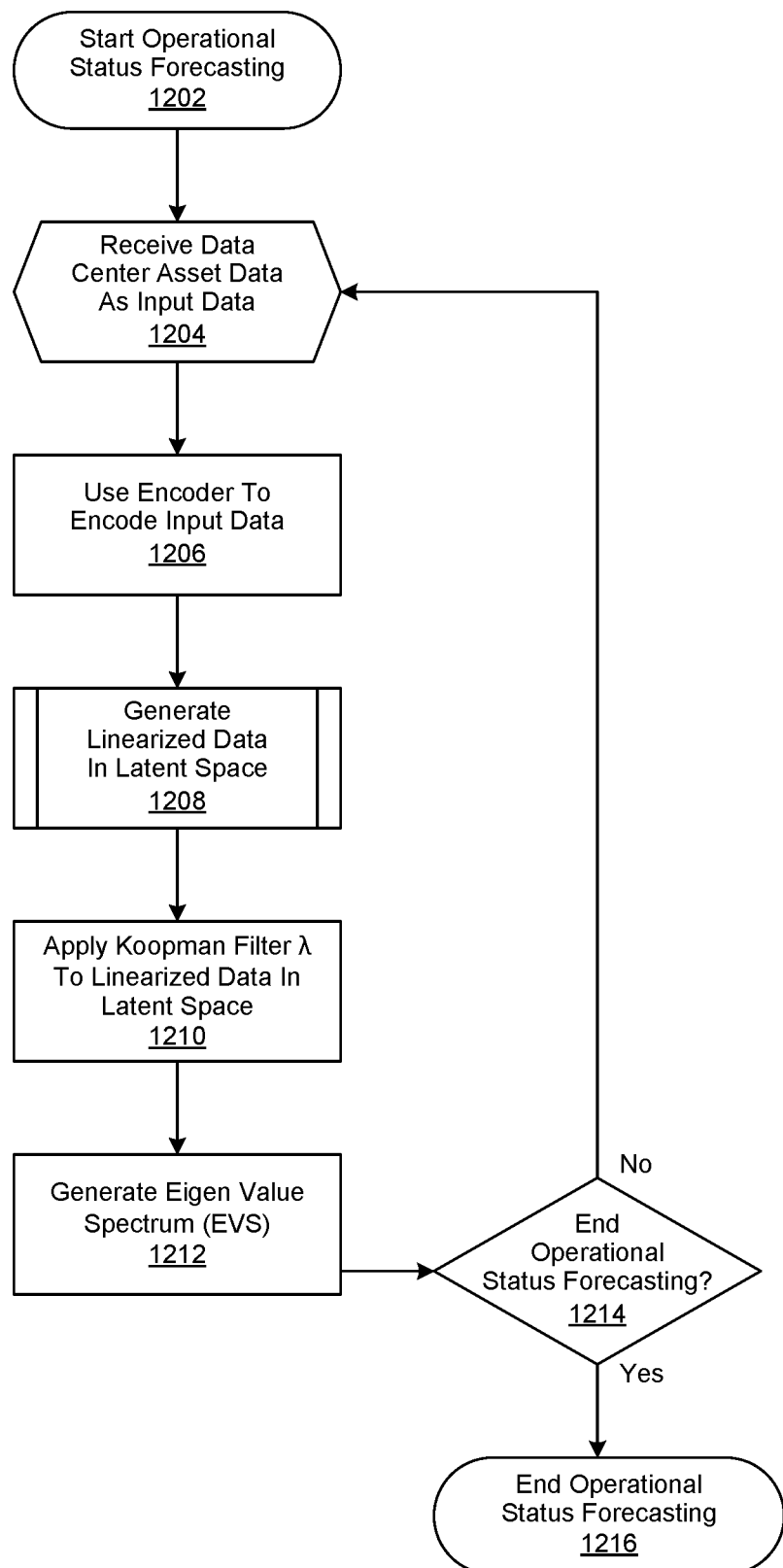
FIG. 12 shows the performance of certain operational status forecasting operations.

FIG. 12 shows the performance of certain operational status forecasting operations performed in accordance with an embodiment of the invention. In this embodiment, operational status forecasting operations are begun in step 1202, followed by the receipt of certain data center asset data as input data in step 1204. The input data is then encoded in step 1206 by an encoder to generate linearized data within a latent space in step 1208 as described in greater detail herein.

A Koopman filter X is then applied in step 1210 to the smallest dimensional value of the linearized data in the latent space to generate a sequence of Eigenvalues as an Eigenvalue spectrum (EVS) in step 1212, as likewise described in greater detail herein. A determination is then made in step 1214 whether to continue operational asset status forecasting operations. If so, then the process is continued in step 1204. Otherwise, operational status forecasting operations are ended in step 1216.

Figure 13:
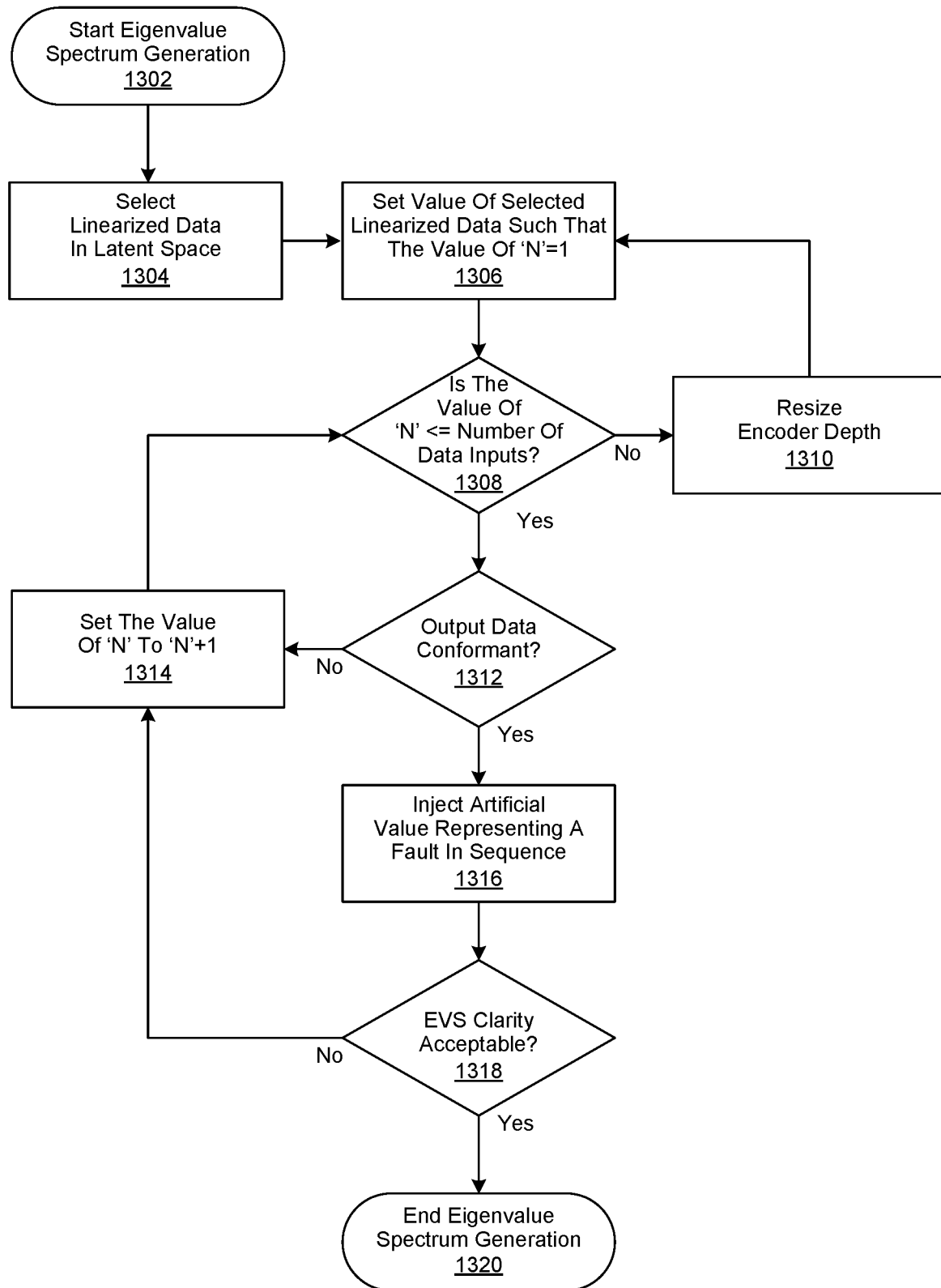
FIG. 13 shows the performance of certain Eigenvalue spectrum (EVS) generation operations.

FIG. 13 shows the performance of certain Eigenvalue spectrum (EVS) generation operations performed in accordance with an embodiment of the invention. In this embodiment, EVS generation operations are begun in step 1302, followed by the selection of certain linearized data in a latent space in step 1304. The dimensional value of the selected linearized data is then set in step 1306 such that the dimensional value of 'N' is equal to 1, as described in greater detail herein.

A determination is then made in step 1308 whether the dimensional value of 'N' is less than or equal to the number of data inputs. If not, then the encoder depth is resized in step 1310 and the process is continued, proceeding with step 1306. In certain embodiments, the encoder depth is resized in step 1310 by adding additional encoders.

Otherwise, a determination is made in step 1312 whether the output data is conformant to the input data. If not, then the dimensional value of 'N' is set to 'N'+1 in step 1314 and the process is continued, proceeding with step 1308. Otherwise, an artificial value representing an operational fault for a data center asset is injected within the sequence in step 1316.

A determination is then made in step 1318 whether the clarity of the EVS is acceptable. If not, then the process is continued, proceeding with step 1314. Otherwise, EVS generation operations are ended in step 1320.

Figure 14:
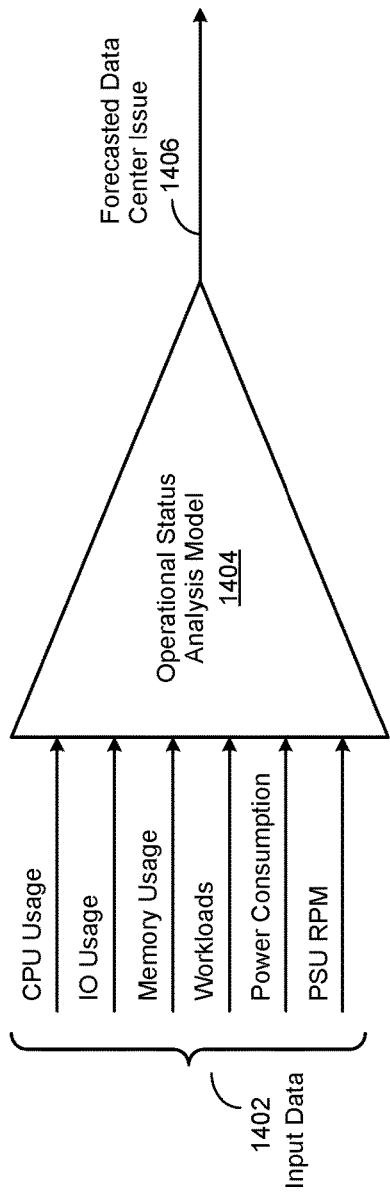
FIG. 14 is a simplified OSA model implemented to forecast the occurrence of a particular data center issue.

FIG. 14 is a simplified operational status analysis (OSA) model implemented in accordance with an embodiment of the invention to forecast the occurrence of a particular data center issue. In various embodiments, certain input data 1402 may be used by an OSA model 1404, as described in greater detail herein, to forecast the occurrence of a particular data center issue, likewise described in greater detail herein. As an example, as shown in FIG. 14, the input data 1402 may include certain telemetry data collected from a particular server. To continue the example, such telemetry data may include information associated with utilization of the server's processor, ports, and memory, the type and respective resource utilization of the workloads it may be processing, along with its power consumption and the speed of its power supply fans. To continue the example further, the input data 1402 may be used by the OSA model 1404 to forecast a data center issue 1406 related to the server being overloaded at a particular point in time in the future.

Figure 15:
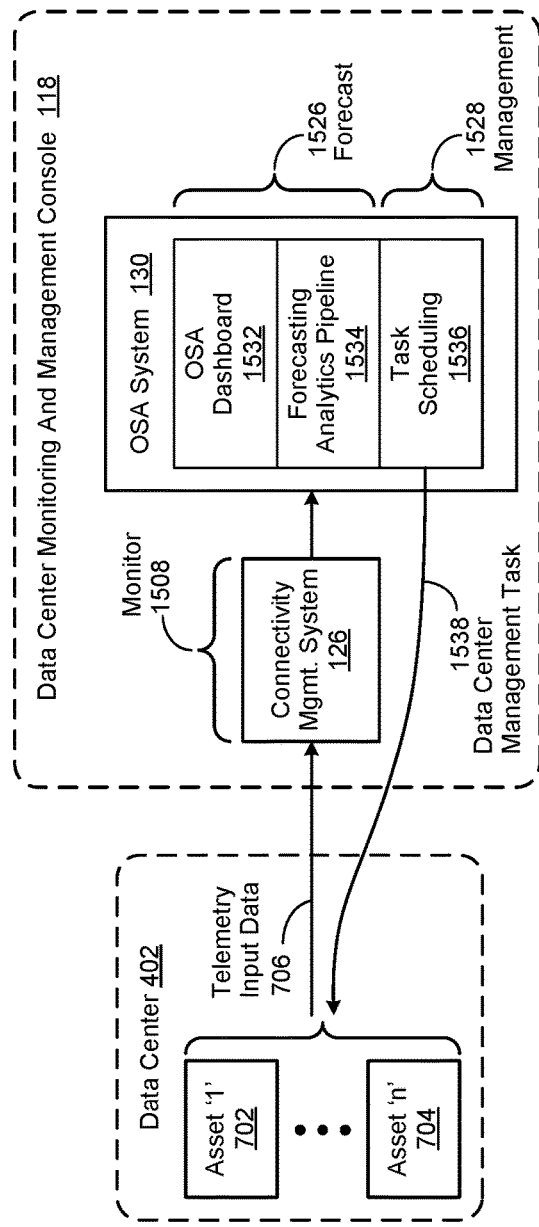
FIG. 15 is a simplified block diagram showing the performance of a sequence of certain OSA operations to forecast the occurrence of a particular data center issue.

FIG. 15 is a simplified block diagram showing the performance of a sequence of certain operational status analysis (OSA) operations implemented in accordance with an embodiment of the invention to forecast the occurrence of a particular data center issue. In various embodiments, a data center monitoring and management console 118 may be implemented to include a connectivity management system (CMS) 126 and an OSA system 130, both of which are described in greater detail herein. In various embodiments, the CMS 126 may be implemented to receive certain telemetry input data 706 from one or more data center assets '1' 702 through 'n' 704.

In various embodiments, the CMS 126 may be implemented to monitor 1508 the telemetry input data 706 and provide certain portions thereof as event data, described in greater detail herein, to the OSA system 130. In various embodiments, the OSA system 130 may be implemented to perform, directly or indirectly, certain functions, operations, procedures, or processes associated with a data center issue forecasting 1526 phase, or a management 1528 phase, or both. In various embodiments, the OSA system 130 may be implemented to include an OSA dashboard 1532.

In certain embodiments, the analysis dashboard 1532 may be implemented to perform one or more OSA operations, described in greater detail herein, to generate a forecasting analytics pipeline 1534. As used herein, a forecasting analytics pipeline 1534 broadly refers to pipeline, or sequence, of forecasted data center issues. In certain embodiments, the data center issue forecasting phase 1526 may include the use of the OSA dashboard 1532 to generate a forecasting analytics pipeline 1534. In various embodiments, the data center issue management phase 1528 may include the scheduling 1536 of one or more data center management tasks, described in greater detail herein.

Figure 16:
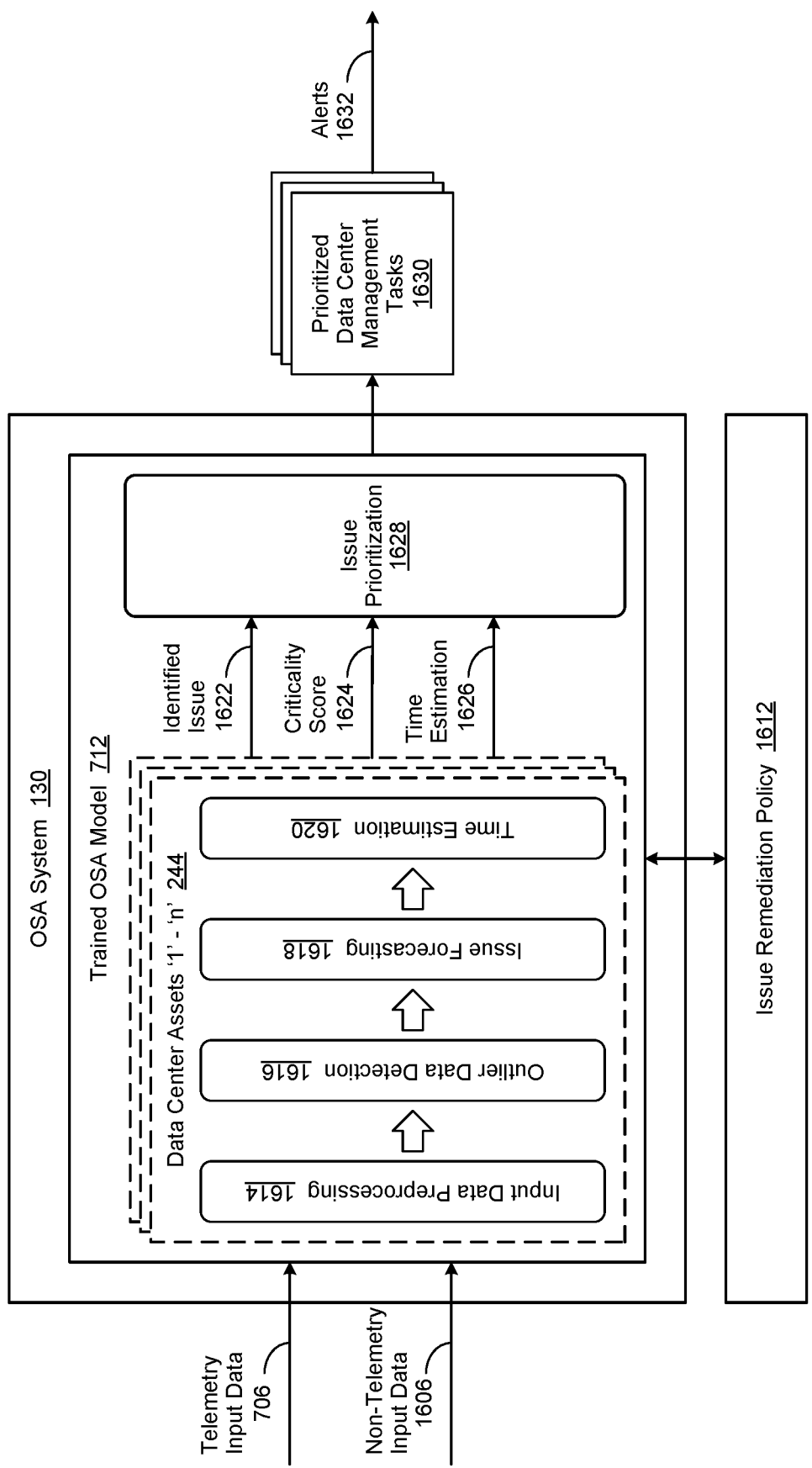
FIG. 16 is a simplified block diagram of an OSA system implemented to prioritize the remediation of data center issues.

FIG. 16 is a simplified block diagram of an operational status analysis (OSA) system implemented in accordance with an embodiment of the invention to prioritize the remediation of data center issues. In various embodiments, the OSA system 130 may be implemented to receive certain telemetry 706 and other input data 1604, associated with a particular data center asset '1' through 'n' 244. In various embodiments, the non-telemetry 1606 input data may include operational parameters associated with a particular data center asset '1' through 'n' 244, such as its designated upper and lower operating temperature limits, service intervals, mean time before failure (MTBF), and so forth.

In various embodiments, an OSA system 130 may be implemented to use certain portions of the received telemetry 706 and non-telemetry 1606 input data in combination with a trained OSA model 712, as described in greater detail herein, to perform a sequence of OSA operations. In various embodiments, the sequence of OSA operations may include one or more input data preprocessing 1614, outlier data detection 1616, data center issue forecasting 1618, and time estimation 1620 operations, or a combination thereof, for one or more data center assets '1' through 'n' 244. In various embodiments, one or more input data preprocessing 1614 operations may be implemented to resample certain telemetry 706 and non-telemetry 1606 input data, augment new features, interpolate gaps in received data, and so forth.

In various embodiments, one or more outlier data detection 1616 operations may be performed to detect certain data, as described in greater detail herein, corresponding to anomalous, unusual, or unexpected operational behavior of a particular data center asset '1' through 'n' 244. In various embodiments, one or more data center issue forecasting 1618 operations may be performed, as described in greater detail herein, to forecast the operational status of a particular data center asset '1' through 'n' 244 at a particular point of time in the future. In various embodiments, one or more time estimation 1620 operations may be performed to estimate the time remaining before the forecasted occurrence of a particular data center issue. Accordingly, as used herein, a time estimation 1620 operation broadly refers to any operation performed to forecast the future operational state of a particular data center asset, such as the occurrence of an associated data center issue, at a particular point in time.

In various embodiments, the trained OSA model 712 may be implemented to generate certain data associated with an identified data center issue 1622, a criticality score 1624, and a time estimation 1626. In various embodiments, the data associated with an identified data center issue 1622 may include certain descriptive or classification information, such as details describing the issue (e.g., fan is about to fail) or the type of issue it may be (e.g., overheating). In various embodiments, the criticality score 1624 may be implemented to indicate the degree of criticality corresponding to a particular identified data center issue 1622. In these embodiments, criteria by which the criticality of a particular data center issue may be determined, and the method by which its associated criticality score 1624 may be determined and assigned to its corresponding data center issue, is a matter of design choice. In various embodiments, the time estimation 1626 may be implemented to provide an estimation of when a particular identified data center issue 1622 is forecasted to occur.

In various embodiments, the OSA system 130 may be implemented to use the trained OSA model 712 and a data center issue remediation policy 1612, individually or in combination, to perform an issue prioritization 1628 operation. As used herein, an issue prioritization 1628 operation broadly refers to any operation performed, directly or indirectly, to prioritize the remediation of one data center issue over another. In certain embodiments, such prioritization may be determined as follows:

$$x_{t+1} = f(x_t, u_t)$$
$$u_t = \pi(x_t)$$

where $u$ = control, demand, risk, failure at a particular point in time $t$

Various embodiments of the invention reflect an appreciation that such prioritization of data center issues may be likened to triage approaches commonly used in the medical profession to prioritize the treatment of patients. Accordingly, various embodiments of the invention likewise reflect an appreciation that certain data center issues may be so catastrophic in their nature that the only possible remediation is physical replacement of the asset.

In various embodiments, the data center issue remediation policy 1612 may be implemented to detail parameters and criteria defining the circumstances under which the remediation of one data center issue may be prioritized over another. In various embodiments, the OSA system 130 may be implemented to perform a reward shaping operation, described in greater detail herein, to train the data center issue remediation policy 1612. In certain of these embodiments, the training of the data center issue remediation policy 1612 may be adaptive. In various embodiments, such training may involve the use of supervised, unsupervised, or semi-supervised training approaches, or a combination thereof.

In various embodiments, the training of the issue remediation policy 1612 may result in the revision of certain parameters, criteria, rules, or operational states, or a combination thereof, that it may contain. Examples of such parameters, criteria, rules, and operational states that may be contained in the data center issue remediation policy 1612 include service level agreements (SLAs), workload criticality levels, operational limits, and so forth. In various embodiments, the parameters, criteria, rules, and operational states used to determine whether one data center issue should be prioritized over another for remediation is a matter of design choice.

In various embodiments, the OSA system 130 may be implemented to use certain data associated with an identified data center issue 1622, a criticality score 1624, and a time estimation 1626, respectively corresponding to one or more data center assets '1' through 'n' 244 to perform one or more issue prioritization 1628 operations. In various embodiments, the OSA system 130 may be implemented to use the results of one or more issue prioritization 1628 operations to generate a prioritized list of data center management tasks 1630, described in greater detail herein. In various embodiments, the OSA system 130 may be implemented to generate one or more alerts 1632 associated with the identification of a particular data center issue 1622, its associated criticality score 1624, the estimated point in time 1626 the data center issue is forecasted to occur, its prioritization 1628 for remediation, and the generation of an associated data center management task 1630, or a combination thereof.

Figure 17:
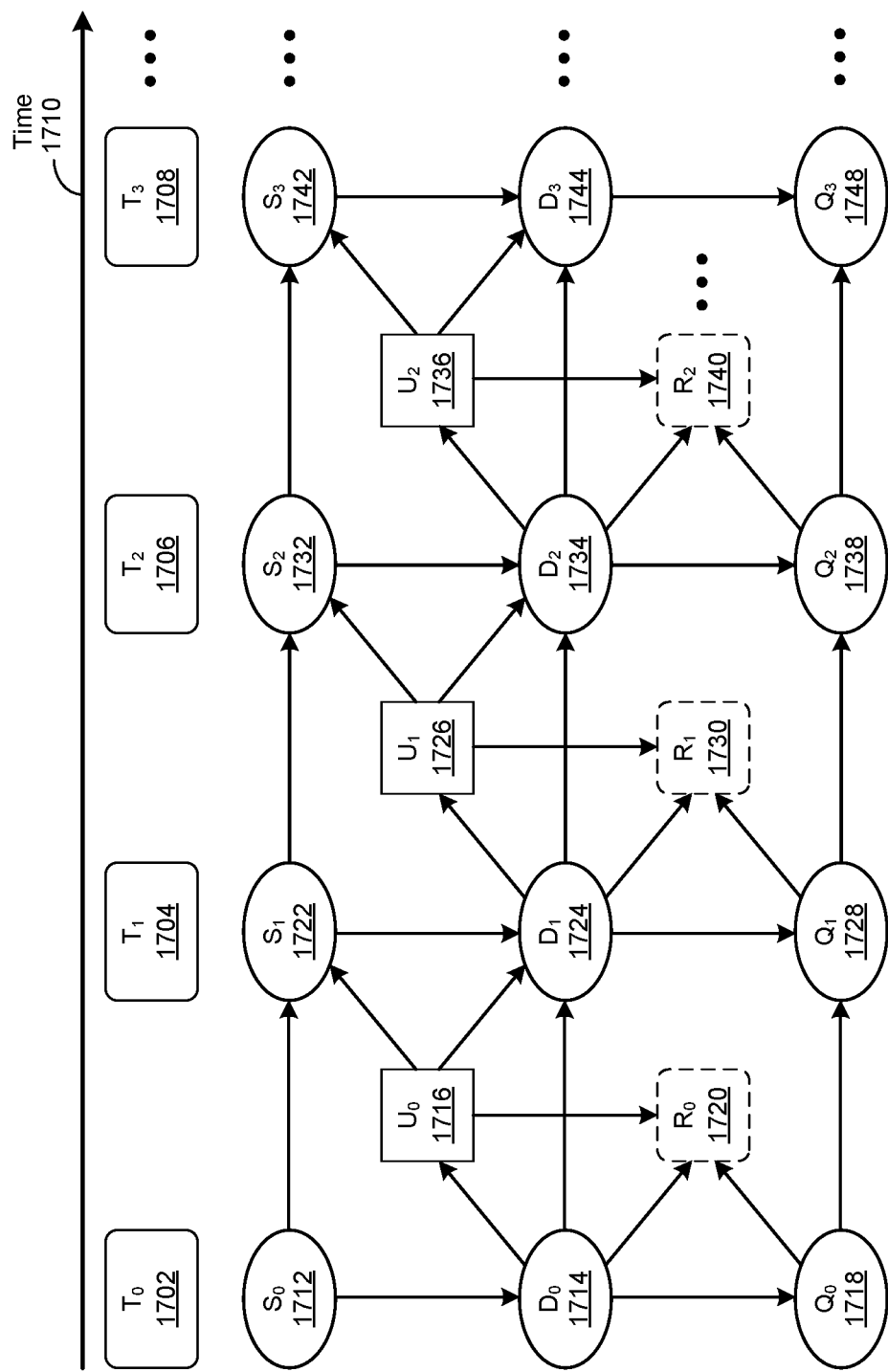
FIG. 17 is a simplified process flow diagram showing the use of an OSA model to perform certain OSA operations to prioritize remediation of a particular data center issue.

FIG. 17 is a simplified process flow diagram showing the use of an operational status analysis (OSA) model to perform certain OSA operations in accordance with an embodiment of the invention to prioritize remediation of a particular data center issue. In various embodiments, the observed physical state $S_0$ 1712, $S_1$ 1722, $S_2$ 1732, $S_3$ 1734 of a particular data center asset at points in time 1710 $T_0$ 1702, $T_1$ 1704, $T_2$ 1706, $T_3$ 1708, and so on, are compared to their forecasted digital state $D_0$ 1714, $D_1$ 1724, $D_2$ 1734, $D_3$ 1744, and so forth. According to the comparison of the data center assets observed physical state, and its forecasted digital state at a particular point in time 1710 $T_0$ 1702, $T_1$ 1704, $T_2$ 1706, $T_3$ 1708, and so on, a corresponding data center management task $U_0$ 1702, $U_1$ 1704, $U_2$ 1706, and so forth, are performed. In certain embodiments, the result of performing the data center management tasks $U_0$ 1702, $U_1$ 1704, $U_2$ 1706, and so forth, may respectively affect the observed physical state $S_1$ 1722, $S_2$ 1732, $S_3$ 1734, and so forth, and the forecasted digital state $D_1$ 1724, $D_2$ 1734, $D_3$ 1744, and so forth, of the data center asset at points in time 1710 $T_1$ 1704, $T_2$ 1706, $T_3$ 1708, and so on.

In certain embodiments, the forecasted digital state $D_0$ 1714, $D_1$ 1724, $D_2$ 1734, $D_3$ 1744, and so forth, of the data center asset may respectively be used to estimate the point in time 1710 $T_0$ 1702, $T_1$ 1704, $T_2$ 1706, $T_3$ 1708, and so on, that a particular data center issue $Q_0$ 1718, $Q_1$ 1728, $Q_2$ 1738, $Q_3$ 1748, and so on, may occur, as described in greater detail herein. In various embodiments, the results of performing data center management tasks $U_0$ 1702, $U_1$ 1704, $U_2$ 1706, and so forth, and the forecasted digital state $D_0$ 1714, $D_1$ 1724, $D_2$ 1734, and so forth, and the estimated point in time 1710 that a particular data center issue $Q_0$ 1718, $Q_1$ 1728, $Q_2$ 1738, and so on, may be used in the performance of a reward shaping operation to determine the value of a corresponding reward $R_0$ 1720, $R_1$ 1730, $R_2$ 1740, and so forth.

As used herein, a reward shaping operation broadly refers to an aspect of reinforcement learning where a model learns to become more accurate by performing an action in an environment based upon feedback in order to maximize the reward. In various embodiments, certain rules and operational states may be used in the performance of a reward shaping operation to prioritize the remediation of one data center issue over another. As likewise used herein, a reward, in the context of a reward shaping operation, broadly refers to an incentive mechanism that characterizes whether the outcome of a particular determination is correct or wrong in terms of reward and punishment.

Figure 18:
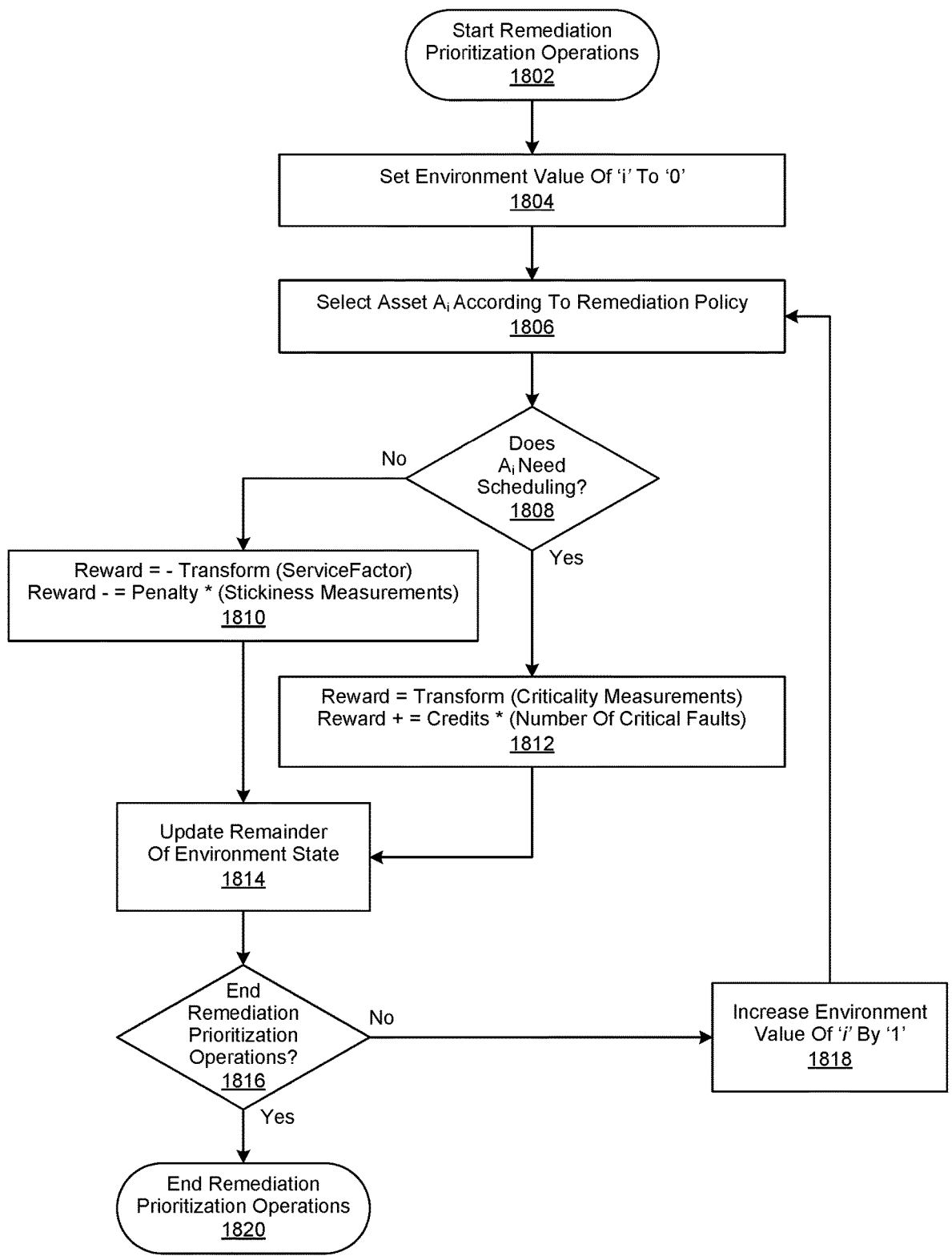
FIG. 18 is a simplified flowchart showing the performance of certain OSA operations to prioritize remediation of a particular data center issue.

FIG. 18 is a simplified flowchart showing certain operational status analysis (OSA) operations performed in accordance with an embodiment of the invention to prioritize remediation of a particular data center issue. In this embodiment, data center issue remediation prioritization operations are begun in step 1802, followed by setting an environment value of i to '0' in step 1804. A particular data center asset issue Ai is then selected in step 1806 according to a remediation policy.

A determination is then made in step 1808 whether data center asset issue Ai needs to be scheduled for remediation. If not, then one or more OSA operations may be performed in step 1810 to decrease the resulting value of an associated reward function by imposing a penalty. In various embodiments, the value of the reward is decreased in step 1810 according to certain associated service factors associated with the data center asset.

However, if it was determined in step 1808 that data center asset issue Ai needs to be scheduled for remediation, then one or more OSA operations may be performed in step 1812 to increase the value of an associated reward function. In various embodiments, the value of the reward is increased in step 1812 according to certain criticality factors associated with the data center asset. Thereafter, or once the resulting value of the reward function has been decreased in step 1810, the remainder of the environment state is updated in step 1814. A determination is then made in step 1816 whether to end data center issue remediation prioritization operations. If not, then the process is continued, proceeding with step 1806. Otherwise, data center issue remediation prioritization operations are ended in step 1818.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center management and monitoring operation, comprising:
receiving data center data from a plurality of data center assets within a data center, the data center data comprising data center asset data;
assigning the data center data to a vectorized input space;
reducing a dimension of the vectorized input space to a latent space, the latent space providing an operational status analysis (OSA) model dimension;
decoding the latent space to provide a vectorized decoded output space;
performing a data center asset operational status forecasting operation using the vectorized decoded output space, the data center asset operational status forecasting operation generating data center asset operational status forecasting data;
performing a time estimation operation, the time estimation operation using the data center asset operational status forecasting data; and,
prioritizing data center asset remediation operations using the data center asset operational status forecasting data; and wherein
the prioritizing uses a reward shaping operation when prioritizing the data center asset remediation operations;
the reward shaping operation is used to train a policy; and,
the policy is trained using one of semi supervised learning and unsupervised learning.

2. The method of claim 1, wherein:
the reward shaping operation uses rules and states when prioritizing the data center asset remediation operations.

3. The method of claim 2, wherein:
the reward shaping operation determines a value of a reward;
the reward includes at least one of a service factor reward and a criticality reward.

4. The method of claim 1, wherein:
the policy training is adaptive.

5. A system comprising:
a processor;
a data bus coupled to the processor;
a data center asset client module; and,
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving data center data from a plurality of data center assets within a data center, the data center data comprising data center asset data;
assigning the data center data to a vectorized input space;
reducing a dimension of the vectorized input space to a latent space, the latent space providing an operational status analysis (OSA) model dimension;
decoding the latent space to provide a vectorized decoded output space;
performing a data center asset operational status forecasting operation using the vectorized decoded output space, the data center asset operational status forecasting operation generating data center asset operational status forecasting data;
performing a time estimation operation, the time estimation operation using the data center asset operational status forecasting data; and,
prioritizing data center asset remediation operations using the data center asset operational status forecasting data; and wherein
the prioritizing uses a reward shaping operation when prioritizing the data center asset remediation operations;
the reward shaping operation is used to train a policy; and,
the policy is trained using one of semi supervised learning and unsupervised learning.

6. The system of claim 5, wherein:
the reward shaping operation uses rules and states when prioritizing the data center asset remediation operations.

7. The system of claim 6, wherein:
the reward shaping operation determines a value of a reward;
the reward includes at least one of a service factor reward and a criticality reward.

8. The system of claim 5, wherein:
the policy training is adaptive.

9. A non-transitory, computer-readable storage medium embodying computer program code, the computer program code comprising computer executable instructions configured for:
receiving data center data from a plurality of data center assets within a data center, the data center data comprising data center asset data;
assigning the data center data to a vectorized input space;
reducing a dimension of the vectorized input space to a latent space, the latent space providing an operational status analysis (OSA) model dimension;
decoding the latent space to provide a vectorized decoded output space;
performing a data center asset operational status forecasting operation using the vectorized decoded output space, the data center asset operational status forecasting operation generating data center asset operational status forecasting data;
performing a time estimation operation, the time estimation operation using the data center asset operational status forecasting data; and,
prioritizing data center asset remediation operations using the data center asset operational status forecasting data; and wherein
the prioritizing uses a reward shaping operation when prioritizing the data center asset remediation operations;
the reward shaping operation is used to train a policy; and,
the policy is trained using one of semi supervised learning and unsupervised learning.

10. The non-transitory, computer-readable storage medium of claim 9, wherein:
the reward shaping operation uses rules and states when prioritizing the data center asset remediation operations.

11. The non-transitory, computer-readable storage medium of claim 10, wherein:
the reward shaping operation determines a value of a reward;
the reward includes at least one of a service factor reward and a criticality reward.

12. The non-transitory, computer-readable storage medium of claim 9, wherein:
the policy training is adaptive.

13. The non-transitory, computer-readable storage medium of claim 9, wherein:
the computer executable instructions are deployable to a client system from a server system at a remote location.

14. The non-transitory, computer-readable storage medium of claim 9, wherein:
the computer executable instructions are provided by a service provider to a user on an on-demand basis.

* * * * *